(12) United States Patent
Jackson et al.

(10) Patent No.: US 11,951,420 B2
(45) Date of Patent: Apr. 9, 2024

(54) FILTER APPARATUS AND METHOD

(71) Applicant: Evolution Aqua Limited, Wigan (GB)

(72) Inventors: Nicholas John Jackson, Ormskirk (GB); Jasper Hendericus Maria Kuijper, Burscough (GB)

(73) Assignee: EVOLUTION AQUA LIMITED, Wigan (GB)

( * ) Notice: Subject to any disclaimer, the term of this patent is extended or adjusted under 35 U.S.C. 154(b) by 1015 days.

(21) Appl. No.: 16/301,889

(22) PCT Filed: May 16, 2017

(86) PCT No.: PCT/EP2017/061766
§ 371 (c)(1),
(2) Date: Nov. 15, 2018

(87) PCT Pub. No.: WO2017/198679
PCT Pub. Date: Nov. 23, 2017

(65) Prior Publication Data
US 2020/0269163 A1    Aug. 27, 2020

(30) Foreign Application Priority Data

May 16, 2016 (GB) ...................................... 1608550
May 16, 2016 (GB) ...................................... 1608615

(Continued)

(51) Int. Cl.
*B01D 24/46* (2006.01)
(52) U.S. Cl.
CPC ..... *B01D 24/4636* (2013.01); *B01D 24/4642* (2013.01)
(58) Field of Classification Search
CPC .............. A01K 63/045; B01D 24/4636; B01D 24/4642; C02F 2103/20
(Continued)

(56) References Cited

U.S. PATENT DOCUMENTS

| 656,043 | A | 8/1900 | Paterson |
| 3,298,523 | A | 1/1967 | Johnson |

(Continued)

FOREIGN PATENT DOCUMENTS

| CN | 1765461 A | 5/2006 |
| CN | 103272415 A | 9/2013 |

(Continued)

OTHER PUBLICATIONS

International Search Report and Written Opinion of the International Searching Authority, International Application No. PCT/EP2018/081193, dated Jan. 4, 2019, 11 pp.

(Continued)

*Primary Examiner* — Claire A Norris
(74) *Attorney, Agent, or Firm* — Myers Bigel, P.A.

(57) ABSTRACT

The present disclosure relates to a filter apparatus (1) for mechanically filtering a liquid (W). The filter apparatus (1) includes a filter chamber (5) for containing a plurality of filter elements (7) that form a filter pack (29) for filtering the liquid. The filter chamber (5) has a liquid inlet (12) and a liquid outlet (14). The filter apparatus (1) includes means for introducing air into the filter chamber (5) through one or more air inlets (25) to agitate the filter elements (7). The filter chamber (5) is substantially sealed and the air introducing means (22) may be configured to draw air into the filter chamber (5) as liquid is drained from said filter chamber (5). In certain embodiments, the filter chamber (5) may have a substantially constant profile or a substantially continuously tapered profile along its longitudinal axis (X-X). The present disclosure also relates to methods of filtering a liquid (W).

13 Claims, 20 Drawing Sheets

(30) Foreign Application Priority Data

May 16, 2016 (WO) ................ PCT/GB2016/000101
Mar. 7, 2017 (GB) ..................................... 1703659

(58) Field of Classification Search
USPC ........ 210/274, 108, 792, 170.02, 275, 416.2
See application file for complete search history.

(56) References Cited

U.S. PATENT DOCUMENTS

| | | | |
|---|---|---|---|
| 3,720,317 A | 3/1973 | Willinger | |
| 4,002,705 A | 1/1977 | McKeown | |
| 4,122,011 A | 10/1978 | Strigle, Jr. | |
| 4,218,317 A | 8/1980 | Kirschmann | |
| 4,290,894 A | 9/1981 | Török et al. | |
| 4,295,965 A | 10/1981 | Köster | |
| 4,368,123 A | 1/1983 | Stanley | |
| 4,385,988 A | 5/1983 | Hyppönen | |
| D275,310 S | 8/1984 | Stanley | |
| D296,463 S | 6/1988 | Padilla | |
| D307,933 S | 5/1990 | Baer | |
| D318,093 S | 7/1991 | Ferguson | |
| D323,017 S | 1/1992 | Bernstein | |
| 5,108,594 A | 4/1992 | Giovanetti et al. | |
| 5,232,586 A * | 8/1993 | Malone ................ | C02F 3/06 210/151 |
| 5,458,779 A | 10/1995 | Odegaard | |
| 5,582,722 A | 12/1996 | Wachinski et al. | |
| 5,779,886 A | 7/1998 | Couture | |
| 5,951,876 A | 9/1999 | Snowball | |
| 6,048,456 A | 4/2000 | Palmer | |
| 6,080,304 A | 6/2000 | Gomi | |
| 6,276,302 B1 | 8/2001 | Lee | |
| 6,423,537 B1 | 7/2002 | Soria et al. | |
| 6,447,675 B1 | 9/2002 | James | |
| D465,257 S | 11/2002 | Van Olst et al. | |
| 6,517,724 B1 | 2/2003 | Malone | |
| 6,616,845 B2 | 9/2003 | Shechter et al. | |
| 6,685,826 B1 | 2/2004 | James | |
| 6,709,574 B2 | 3/2004 | James | |
| 6,726,838 B2 | 4/2004 | Shechter et al. | |
| 7,431,848 B2 | 10/2008 | James | |
| D611,120 S | 3/2010 | Brockdorff | |
| D611,568 S | 3/2010 | Westrum | |
| D612,007 S | 3/2010 | Brockdorff | |
| D618,760 S | 6/2010 | Flournoy et al. | |
| D619,201 S | 7/2010 | Westrum | |
| D645,116 S | 9/2011 | McKean et al. | |
| D645,159 S | 9/2011 | Loken | |
| D645,161 S | 9/2011 | Loken | |
| D648,821 S | 11/2011 | McKean et al. | |
| D661,778 S | 6/2012 | Dempster et al. | |
| 8,241,717 B1 | 8/2012 | Anderson | |
| D696,744 S | 12/2013 | Barrett | |
| D697,168 S | 1/2014 | Rusten et al. | |
| D700,014 S | 2/2014 | Zeanah | |
| D716,414 S | 10/2014 | Glen | |
| D718,412 S | 11/2014 | Flournoy et al. | |
| D747,785 S | 1/2016 | Ruprecht | |
| 9,249,036 B2 | 2/2016 | Williams et al. | |
| D750,737 S | 3/2016 | Ashley | |
| D758,529 S | 6/2016 | Boudreau et al. | |
| D762,279 S | 7/2016 | Flournoy et al. | |
| D785,132 S | 4/2017 | Jackson et al. | |
| 2002/0158001 A1 | 10/2002 | Northcut et al. | |
| 2004/0144728 A1 | 7/2004 | Moller et al. | |
| 2004/0149233 A1 | 8/2004 | Cummins | |
| 2004/0225085 A1 | 11/2004 | Glover et al. | |
| 2005/0029204 A1* | 2/2005 | Schwartzkopf .... | B01D 24/4636 210/793 |
| 2005/0035042 A1 | 2/2005 | Rowe et al. | |
| 2006/0151366 A1 | 7/2006 | Hoang | |
| 2007/0048174 A1 | 3/2007 | James | |
| 2007/0131621 A1 | 6/2007 | Denton | |
| 2008/0017561 A1 | 1/2008 | Shaw et al. | |
| 2009/0071909 A1 | 3/2009 | Newcombe et al. | |
| 2009/0178980 A1 | 7/2009 | Newcombe | |
| 2013/0118992 A1 | 5/2013 | Henig | |
| 2017/0313608 A1 | 11/2017 | Peterson et al. | |
| 2018/0362361 A1 | 12/2018 | Archer | |
| 2021/0039962 A1 | 2/2021 | Heitele et al. | |
| 2022/0242763 A1 | 8/2022 | Peterson et al. | |

FOREIGN PATENT DOCUMENTS

| | | |
|---|---|---|
| DE | 2 310 652 A1 | 10/1973 |
| DE | 19819676 A1 | 11/1999 |
| DE | 102014106810 A1 | 11/2015 |
| EM | 006471132-0001 | 5/2019 |
| EM | 006471132-0002 | 5/2019 |
| EP | 0 484 896 A1 | 5/1992 |
| FR | 2 026 341 | 9/1970 |
| FR | 2 500 320 A1 | 8/1982 |
| FR | 2 612 419 A1 | 9/1988 |
| GB | 1 275 116 | 5/1972 |
| GB | 1 429 183 A | 3/1976 |
| GB | 1 498 360 | 1/1978 |
| GB | 2 093 728 A | 9/1982 |
| GB | 2 101 901 A | 1/1983 |
| GB | 2 318 526 A | 4/1998 |
| GB | 2 422 793 A | 8/2006 |
| GB | 2550495 A | 11/2017 |
| GB | 2540847 B | 12/2017 |
| GB | 2552439 A | 1/2018 |
| GB | 2552762 A | 2/2018 |
| JP | H10230275 A | 9/1998 |
| JP | 2002143840 A | 5/2002 |
| JP | 2002316148 A | 10/2002 |
| JP | 2003260480 A | 9/2003 |
| KR | 101005470 B1 | 1/2011 |
| WO | 02/096806 A2 | 12/2002 |
| WO | 2006/082447 A2 | 8/2006 |
| WO | WO 2006/082447 A2 | 8/2006 |
| WO | WO 2006/082447 A3 | 8/2006 |
| WO | 2009135249 A1 | 11/2009 |
| WO | WO 2015/115740 A1 | 8/2015 |
| WO | 2016185159 A1 | 11/2016 |
| WO | 2019/096826 A1 | 5/2019 |

OTHER PUBLICATIONS

Patents Act 1977: Combined Search and Examination Report under Sections 17 and 18(3), UKIPO Application No. GB1817447.4, dated Nov. 23, 2018, 8 pp.
"Communication Pursuant to Article 94(3) EPC", EP Application No. 16725881.3, dated Jul. 24, 2020, 4 pp.
Decision of Rejection and English language translation, Chinese Application No. 201680037110.2, dated Jun. 28, 2019, 9 pp.
McQuarrie et al., "Moving Bed Biofilm Reactor Technology: Process Applications, Design, and Performance", Water Environment Research, vol. 83, No. 6, Jun. 2011, pp. 560-575.
Patents Act 1977: Combined Search and Examination Report under Sections 17 and 18(3), UKIPO Application No. GB1718912.7, dated Apr. 30, 2019, 8 pp.
Rasmussen, "The Kaldnes Moving Bed™ biofilm process—an innovative solution to biological waste water treatment", yakutec.com; http://www.yacutec.com/documentos/LM-02 the kaldnes moving bed.pdf; accessed Nov. 15, 2016, 9 pp.
International Search Report and Written Opinion of the International Searching Authority, International Application No. PCT/GB2016/000101, dated Sep. 19, 2016, 17 pp.
Patents Act 1977: Combined Search and Examination Report under Sections 17 and 18(3), UKIPO Application No. GB1608550.8, dated Nov. 16, 2016, 8 pp.
Patents Act 1977: Combined Search and Examination Report under Sections 17 and 18(3), UKIPO Application No. GB1718281.7, dated Dec. 1, 2017, 5 pp.
Patents Act 1977: Combined Search and Examination Report under Sections 17 and 18(3), UKIPO Application No. GB1718291.6, dated Nov. 16, 2017, 5 pp.

(56) References Cited

OTHER PUBLICATIONS

Patents Act 1977: Examination Report under Section 18(3), UKIPO Application No. GB1718291.6, dated Jul. 20, 2018, 3 pp.
International Search Report and Written Opinion of the International Searching Authority, International Application No. PCT/EP2017/061766, dated Nov. 21, 2017, 22 pp.
Invitation to Pay Additional Fees and, Where Applicable, Protest Fee, International Application No. PCT/GB2018/050578, dated Jun. 8, 2018, 10 pp.
Patents Act 1977: Combined Search and Examination Report under Sections 17 and 18(3), UKIPO Application No. GB1803646.7, dated Jul. 30, 2018, 6 pp.
Patents Act 1977: Search Report under Section 17(5), UKIPO Application No. GB1707874.2, dated Sep. 15, 2017, 4 pp.
First Office Action and English language translation, Chinese Application No. 201680037110.2, dated Sep. 30, 2018, 18 pp.
Examination report under sections 12 & 13 of the Patents Act, 1970 and the Patents Rules, 2003, Indian Patent Application No. 201717044841, dated May 19, 2020, 6 pp.
"Examination report under sections 12 & 13 of the Patents Act, 1970 and the Patents Rules, 2003", Indian Patent Application No. 201817045927, dated Jan. 18, 2021, 8 pp.
"Translation of First Office Action", CN Application No. 201780043182.2, dated Nov. 11, 2020, 4 pp.
"Notice of Review and English language translation", CN Application No. 201680037110.2, dated May 6, 2021, 36 pp.
"Notice prior to receipt of patent application number with English language translation", IL Application No. 255620, dated Feb. 24, 2021, 8 pp.
"Notification of Second Opinion and English language translation", CN Application No. 201780043182.2, dated Jul. 1, 2021, 44 pp.
"Patents Act 1977: Examination Report under Section 18(3)", UKIPO Application No. GB1707874.2, dated Sep. 7, 2021, 5 pp.
"Search and Examination Reports", UAE Application No. P6001461/2017, dated Feb. 16, 2021, 14 pp.
"Search Report and Opinion", BR Application No. BR112018073656-2, dated May 31, 2021, 4 pp.

Examination report No. 1 for standard patent application, IP Australia Application No. 2016263651, dated Nov. 6, 2019, 2 pp.
Patents Act 1977: Examination Report under Section 18(3), UKIPO Application No. GB1817447.4, dated Sep. 11, 2019, 3 pp.
Patents Act 1977: Intention to Grant under Section 18(4), UKIPO Application No. GB1817447.4, dated Nov. 14, 2019, 2 pp.
Patents Act 1977: Examination Report under Section 18(3), UKIPO Application No. GB1817447.4, dated Nov. 4, 2019, 3 pp.
Communication pursuant to Article 94(3) EPC, EP Application No. 17723128.9, dated Apr. 23, 2020, 5 pp.
Second Office Action and English language translation, CN Application No. 201680037110.2, dated Mar. 20, 2019, 15 pp.
"Communication Pursuant to Article 94(3) EPC", EP Application No. 17723128.9, dated Mar. 30, 2022, 5 pp.
"Examination report No. 1 for standard patent application", AU Application No. 2017267212, dated Feb. 17, 2022, 5 pp.
"Notification regarding defects in patent application", IL Application No. 262952, dated Jan. 20, 2022, 6 pp.
"Notification regarding defects in patent application 262952", IL Patent Application No. 262952, dated Jan. 20, 2022, 6 pp.
"Brief Communication", EP Application No. 16725881.3, dated Oct. 18, 22, 1 p.
"Examination Report", CA Application No. 2,985,927, dated Mar. 25, 2022, 5 pp.
"Summons to attend oral proceedings pursuant to Rule 115(1) EPC", EP Application No. 16725881.3, dated Jul. 12, 2022, 7 pp.
"Communication pursuant to Article 94(3) EPC", EP Application No. 17723128.9, dated Mar. 27, 2023, 6 pp.
"Examination Report", CA Application No. 3,023,615, dated Mar. 7, 2023, 3 pp.
"Invitation to Pay Additional Fees and, Where Applicable, Protest Fee with Communication Relating to the Results of the Partial International Search", International Application No. PCT/EP2023/082589, Jan. 8, 2024, 11 pp.
"International Search Report", International Application No. PCT/EP2023/082586, Jan. 23, 2024, 4 pp.
"Summons to attend oral proceedings pursuant to Rule 115(1) EPC", EP Application No. 17723128.9, Jan. 31, 2024, 5 pp.

\* cited by examiner

FILTER APPARATUS AND METHOD

TECHNICAL FIELD

The present disclosure relates to a filter apparatus and method. More particularly, but not exclusively, the present disclosure relates to filter apparatus for performing mechanical filtration of a liquid, and a related method. The filter apparatus and method may be suitable for filtering water in aquariums. Alternatively, or in addition, the filter apparatus may be suitable for filtering water in ponds, aqua-culture, swimming pools, swimming baths, swimming ponds, leisure pools, hot tubs, spas and leisure parks.

BACKGROUND

A floating media hourglass biofilter is known from U.S. Pat. No. 5,232,586. The biofilter comprises a tank having a hourglass profile to form a filtration chamber and an expansion chamber. A washing throat is formed in the tank to define the hourglass profile. A floating filter media in the form of solid pellets is provided in the tank to form a media pack in the filtration chamber. An air inlet line is connected to the tank for drawing air into the expansion chamber and disturbing the floating media pack inside the filtration chamber during backwashing of the biofilter. A sludge valve is opened allowing water to drain from the tank. A negative pressure is thereby established in the tank and air is drawn into the expansion chamber from atmosphere. The level of the water in the tank drops and the floating media travels from the filtration chamber into the expansion chamber. The washing throat promotes turbulence to fluidize the media pack. The downward expansion of floating media into the expansion chamber shearing biofloc and captured suspended solids from the solid pellets.

The washing throat forms a restriction in the filter chamber which impedes the movement of the filter media as the water level in the tank decreases. As the water level drops below the washing throat, the filter media are released into the expansion chamber. The backwashing relies on the increased excitation during this transition to shear biofloc from the exterior of the filter media. This backwashing strategy has been developed for pellets adapted to perform biological filtration. However, this approach may not be appropriate for other types of filter elements, for example configured to perform mechanical filtration.

It is against this backdrop that the present invention(s) have been conceived. At least in certain embodiments, the present invention seeks to overcome or ameliorate at least some of the problems or limitations associated with prior art filters.

SUMMARY OF THE INVENTION

Aspects of the present invention relate to a filter apparatus as claimed in the appended claims.

According to a further aspect of the present invention there is provided a filter apparatus for mechanically filtering a liquid, the filter apparatus comprising:
- a filter chamber for containing a plurality of filter elements that form a filter pack for mechanically filtering the liquid, the filter chamber having a longitudinal axis and comprising a liquid inlet and a liquid outlet; and
- means for introducing air into the filter chamber through one or more air inlets to agitate the filter elements, the filter chamber being substantially sealed and the air introducing means being configured to draw air into the filter chamber as liquid is drained from said filter chamber;
- wherein the filter chamber has a substantially constant profile or a substantially continuously tapered profile along said longitudinal axis. The filter apparatus is operable to perform filtration and backwashing. The filter chamber is formed without constrictions or throat sections which may impede or restrict movement of the filter elements as the liquid level in the filter chamber changes, for example as liquid is drained from the filter chamber to perform backwashing. The effective time period during which the filter elements may be washed can usefully be extended. At least in certain embodiments, the filter elements may be agitated substantially continuously as liquid is drained from the filter chamber. The extent of the agitation of the filter elements throughout backwashing is more consistent than prior art systems incorporating a throat which limits movement of the filter elements and then promotes turbulence after the filter media pass through the throat. At least in certain embodiments, continuously agitating the filter elements throughout backwashing is more effective at dislodging mechanically filtered material from the filter elements. This is particularly effective if the filter elements have an open cell structure, for example comprising one or more filter cells, in which debris collects during filtration.

The filter chamber has a sidewall. The longitudinal axis may comprise a central longitudinal axis. In arrangements in which the filter chamber has a substantially constant profile, the sidewall may extend substantially parallel to said longitudinal axis. In arrangements in which the filter chamber has a substantially continuously tapered profile, the sidewall may taper inwardly towards said longitudinal axis or may taper outwardly away from said longitudinal axis.

The filter apparatus may comprise means for retaining the filter elements in said filter chamber whilst allowing liquid to flow into and/or out of the filter chamber. The retaining means may, for example, comprise a mesh, grill or other retaining member. The retaining means could, for example comprise an inlet mesh and an outlet mesh.

The filter chamber is substantially sealed and during filtration the operating pressure in the filter chamber may be greater than atmospheric pressure. In alternative embodiments, during filtration, the operating pressure in the filter chamber may be less than atmospheric pressure. During backwashing the operating pressure in the filter chamber may be less than atmospheric pressure. The reduction in the pressure within the filter chamber to less than atmospheric pressure causes air to be drawn into the filter chamber.

The filter chamber profile is defined relative to said longitudinal axis. The filter chamber has a substantially constant profile or a substantially continuously tapered profile along said longitudinal axis. At least in certain embodiments the longitudinal axis of the filter chamber is arranged substantially vertically.

The filter chamber may be a right circular cylinder.

The liquid inlet and the liquid outlet are typically offset from each other in a vertical direction. The liquid inlet may be provided above the liquid outlet; or the liquid outlet may be provided above the liquid inlet. The higher of said liquid inlet and said liquid outlet may be provided in an upper portion of the filter chamber; and the lower of said liquid inlet and said liquid outlet may be provided in a lower portion of the filter chamber.

The filter chamber may consist of a substantially constant profile or a substantially continuously tapered profile along said longitudinal axis at least between said one or more air inlets and the higher of said liquid inlet and said liquid outlet. The filter chamber may be defined by a filter vessel having a sidewall. The sidewall of the filter vessel may be configured to define the constant profile or the substantially continuously tapered profile of the filter chamber.

The liquid outlet may be disposed above the liquid inlet. The substantially continuously tapered profile may be tapered inwardly along said longitudinal axis in an upwards direction. Thus, an upper portion of the filter chamber may have a smaller cross-section than a lower portion of the filter chamber. This configuration may be used in conjunction with filter elements having substantially neutral buoyancy or positive buoyancy in the liquid to be filtered.

Alternatively, the liquid outlet may be disposed below the liquid inlet. The substantially continuously tapered profile may be tapered outwardly along said longitudinal axis in an upwards direction. Thus, an upper portion of the filter chamber may have a larger cross-section than a lower portion of the filter chamber. This configuration may be used in conjunction with filter elements having substantially neutral buoyancy or negative buoyancy in the liquid to be filtered.

In a variant, the substantially continuously tapered profile may taper outwardly along said longitudinal axis towards the liquid outlet. The cross-sectional area of the filter chamber may increase in a flow direction of the liquid through the filter pack during filtration. The increase in the cross-sectional area of the filter chamber may reduce the flow rate of the liquid as it flows through the filter pack. The reduced rate of flow may promote settlement of debris and particulates suspended in the liquid as it passes through the filter pack during filtration.

The filter chamber may comprise a substantially continuously tapered profile along said longitudinal axis between said one or more air inlets and the liquid outlet. The filter chamber may comprise a truncated cone. The truncated cone may taper inwardly in a direction away from its base. The truncated cone may extend between said one or more air inlets and the liquid outlet. The truncated cone may have a substantially circular cross-section perpendicular to said longitudinal axis. The filter chamber may be elliptical or polygonal in cross-section.

The filter chamber may comprise a substantially continuously tapered profile along said longitudinal axis between said one or more air inlets and the liquid inlet. The filter chamber may comprise an inverted truncated cone. The inverted truncated cone may taper inwardly in a direction towards its base. The inverted truncated cone may extend between said one or more air inlets and the liquid outlet. The inverted truncated cone may have a substantially circular cross-section perpendicular to said longitudinal axis. The filter chamber may be elliptical or polygonal in cross-section.

According to a further aspect of the present invention there is provided a filter apparatus for mechanically filtering a liquid, the filter apparatus comprising:
 a filter chamber for containing a plurality of filter elements that form a filter pack for mechanically filtering the liquid, the filter chamber having a longitudinal axis and comprising a liquid inlet and a liquid outlet;
 means for introducing air into the filter chamber through one or more air inlets to agitate the filter elements, the filter chamber being substantially sealed and the air introducing means being configured to draw air into the filter chamber as liquid is drained from said filter chamber;
 wherein the filter chamber comprises a convex profile along said longitudinal axis.

Thus, the filter chamber may curve or extend outwardly along at least a portion of said longitudinal axis. These arrangements increase the cross-section of the filter chamber (in a plane perpendicular to the longitudinal axis), typically in a central or mid-portion of the filter chamber, such that, in use, there is increased space available for the filter elements to move within the liquid. At least in certain embodiments this may enable increased agitation of the filter elements.

The filter apparatus may comprise means for retaining the filter elements in said filter chamber. The retaining means may retain the filter elements while allowing liquid to flow into and/or out of the filter chamber. The retaining means may, for example, comprise a mesh, grill or other retaining member. The retaining means could, for example comprise an inlet mesh and an outlet mesh.

The convex profile of said filter chamber may be defined by a sidewall having a spherical or part-spherical profile.

The convex profile of said filter chamber may be defined by a sidewall having a spheroidal or part-spheroidal profile. Thus, the sidewall may be defined by a revolution of an ellipsoid, or a portion thereof. The sidewall may comprise an oblate spheroid or a prolate spheroid.

The convex profile of said filter chamber may be defined by a sidewall having a double-cone profile.

The one or more air inlets may be disposed at or proximal to the bottom of the filter chamber.

According to a further aspect of the present invention there is provided a filter apparatus for mechanically filtering a liquid, the filter apparatus comprising:
 a filter chamber for containing a plurality of filter elements that form a filter pack for filtering the liquid, the filter chamber comprising a liquid inlet and a liquid outlet; and
 means for introducing air into the filter chamber through one or more air inlets to agitate the filter elements, the filter chamber being substantially sealed and the air introducing means being configured to draw air into the filter chamber as liquid is drained from said filter chamber.

The means for introducing air into the filter chamber may comprise an air supply conduit having at least one air inlet for introducing air into the filter chamber.

The air supply conduit may be in fluid communication with the liquid outlet. During backwashing, the air supply conduit may be configured to draw air through a liquid return conduit connected to the liquid outlet.

A liquid return valve may be provided for controlling the return of filtered liquid from the filter chamber. The air supply conduit may be connected downstream of the liquid return valve (i.e. on a return side of the liquid return valve). The air supply conduit may be connected to a liquid return conduit connected to the filter chamber. An air supply valve or a restrictor may optionally be provided in the air supply conduit to control the flow of liquid through the air supply conduit during filtration.

The air supply conduit may be disposed inside said filter chamber. For example, the air supply conduit may extends downwardly from said liquid outlet. The air supply conduit may extend substantially vertically within the filter chamber.

The filter apparatus may comprise a drain outlet for draining liquid from the filter chamber; and a drain valve for selectively opening and closing the drain outlet. The drain valve may optionally comprise a drain valve actuator for actuating the drain valve. The drain valve actuator may comprise an electromechanical actuator, such as a solenoid. Other types of actuated valve may be used for the drain valve. For example, the drain valve may be a servo controlled valve.

The filter apparatus may comprise an inlet valve for controlling the flow of liquid to the filter chamber. The inlet valve may optionally comprise an inlet valve actuator. The inlet valve actuator may comprise an electromechanical actuator, such as a solenoid. Other types of actuated valve may be used for the inlet valve. For example, the inlet valve may be a servo controlled valve. In certain embodiments, the inlet valve may comprise a one-way valve, a non-return valve, or a check valve. The inlet valve can be in the form of a liquid supply valve.

The filter apparatus may comprise an outlet valve for controlling the flow of liquid from the filter chamber. The outlet valve may optionally comprise an outlet valve actuator. The outlet valve actuator may comprise an electromechanical actuator, such as a solenoid. Other types of actuated valve may be used for the outlet valve. For example, the outlet valve may be a servo controlled valve. In certain embodiments, the outlet valve may comprise a one-way valve, a non-return valve, or a check valve. The outlet valve can be in the form of a liquid return valve.

The inlet valve and the outlet valve could be separate valves. Alternatively, the inlet valve and the outlet valve may be combined, for example in a multi-port valve.

The air introducing means may comprise an air supply conduit. The air supply conduit may have a check (one-way) valve. The check valve may optionally comprise a check valve actuator for actuating the check valve. The check valve actuator may comprise an electromechanical actuator, such as a solenoid.

The filter apparatus may comprise an electronic control unit (ECU) for controlling one or more of the following: the drain valve actuator, the inlet valve actuator, the outlet valve actuator, and the check valve actuator. The ECU may be configured to control the filter apparatus to perform filtration and backwashing.

To perform filtration, the ECU may be configured to control the drain valve actuator to close the drain valve; and/or the inlet valve actuator to open the inlet valve; and/or the outlet valve actuator to open the outlet valve.

To perform backwashing, the ECU may be configured to control the drain valve actuator to open the drain valve; and/or the inlet valve actuator to close the liquid inlet; and/or the outlet valve actuator to close the liquid outlet.

During filtration, the ECU may be configured to control the check valve actuator to close the check valve. During backwashing, the ECU may be configured to control the check valve actuator to open the check valve.

The ECU may be configured to perform repeated backwashing operations. The ECU may be configured repeatedly at least partially to fill the filter chamber and to drain the filter to perform backwashing.

The filter apparatus may comprise a pump. The pump may be a fixed speed pump or a variable speed pump. The ECU may be configured to output a pump control signal to control operation of the pump. The pump control signal may deactivate the pump during backwashing.

The filter apparatus may comprise a plurality of filter elements in said filter chamber. The filter elements may each have an open cell structure. Each filter element may comprise one or more open cells. The filter elements may have substantially neutral buoyancy, negative buoyancy or positive buoyancy. The filter elements may form a static filter pack in the filter chamber to mechanically filter the liquid.

The flow rate per unit cross-sectional area of the static filter pack is expressed in units of $m^3/m^2/h$ (i.e. the volume of liquid ($m^3$) for a given cross-sectional area of the filter ($m^2$) per hour (h)). The flow rate per unit cross-sectional area of the static filter pack corresponds to the volumetric flow rate through the static filter pack. The filter apparatus may be configured such that during filtration a flow rate per unit cross-sectional area of the static filter pack is greater than 60 $m^3/m^2/h$, 65 $m^3/m^2/h$, 70 $m^3/m^2/h$, 80 $m^3/m^2/h$, 90 $m^3/m^2/h$ or 100 $m^3/m^2/h$. The filter apparatus may be configured such that during filtration a flow rate per unit cross-sectional area of the static filter pack in the range 60 $m^3/m^2/h$ to 550 $m^3/m^2/h$ exclusive. The filter apparatus may be configured such that during filtration a flow rate per unit cross-sectional area of the static filter pack in the range 60 $m^3/m^2/h$ to 150 $m^3/m^2/h$ exclusive. At least in certain embodiments, the filter apparatus may be configured during filtration to provide a flow rate per unit cross-sectional area of the static filter pack in the range 150 $m^3/m^2/h$ to 550 $m^3/m^2/h$; or 200 $m^3/m^2/h$ to 500 $m^3/m^2/h$; or 250 $m^3/m^2/h$ to 450 $m^3/m^2/h$; or 300 $m^3/m^2/h$ to 400 $m^3/m^2/h$; or 325 $m^3/m^2/h$ to 375 $m^3/m^2/h$. The filter apparatus may be configured during filtration to provide a flow rate per unit cross-sectional area of the static filter pack of approximately 350 $m^3/m^2/h$.

By increasing the flow rate per unit cross-sectional area of the static filter pack the cross-sectional area of the filter apparatus may be reduced whilst maintaining the flow rate (litres/hour) through filter apparatus. Thus, the overall dimensions of the filter apparatus may be reduced compared to known filter apparatus which use sand to perform filtration. It is believed that the operation of the filter apparatus at higher flow rates, for example greater than 60 $m^3/m^2/h$, 65 $m^3/m^2/h$, 70 $m^3/m^2/h$, 80 $m^3/m^2/h$, 90 $m^3/m^2/h$ or 100 $m^3/m^2/h$, is patentable independently.

At higher flow speeds, the filter elements may be displaced to form the static filter pack irrespective of the flow direction and/or buoyancy of the filter elements. For example, a down flow of liquid may form a static filter pack even if the filter elements have positive buoyancy. Conversely, an up flow of liquid may form a static filter pack even if the filter elements have negative buoyancy. The break-up of the static filter back may be expedited in these scenarios if the flow through the filter chamber is stopped to perform backwashing.

According to a further aspect of the present invention there is provided a filter apparatus for mechanically filtering a liquid, the filter apparatus comprising:
  a filter chamber for containing a plurality of filter elements that form a filter pack for mechanically filtering the liquid, the filter chamber being substantially sealed and comprising a liquid inlet and a liquid outlet disposed at different heights;
  means for introducing air into the filter chamber through one or more air inlets to agitate the filter elements, the air introducing means being configured to draw air into the filter chamber as liquid is drained from said filter chamber;
  wherein said filter chamber comprises a substantially constant profile. The filter chamber can comprise a right circular cylinder.

According to a still further aspect of the present invention there is provided a method of mechanically filtering a liquid in a filter apparatus, the filter apparatus comprising a filter chamber for containing a plurality of filter elements to form a filter pack, and means for introducing air into the filter chamber through one or more air inlets to agitate the filter elements, the method comprising periodically backwashing the filter apparatus by draining the liquid from the filter chamber such that air is drawn into the filter chamber through said air introduction means;

wherein the method comprises agitating said filter elements substantially continuously and at a substantially uniform rate as liquid is drained from the filter chamber.

According to a further aspect of the present invention there is provided a filter apparatus comprising:

a filter chamber comprising a plurality of mechanical filter elements for forming a static filter pack to perform mechanical filtration of a liquid;

the filter apparatus being configured to generate a flow of the liquid through the mechanical filter elements during filtration;

wherein the filter apparatus is configured to establish a flow rate per unit cross-sectional area of the static filter pack greater than 60 $m^3/m^2/h$ during filtration.

The filter apparatus may comprise means for introducing air into the filter chamber through one or more air inlets to agitate the filter elements. The filter chamber may be substantially sealed and the air introducing means may be configured to draw air into the filter chamber as liquid is drained from said filter chamber.

The filter elements may each have an open cell structure. Each filter element may comprise one or more open cells. The filter elements may form a static filter pack in the filter chamber to mechanically filter the liquid. It has been recognised that the open cell structure of the filter elements enables effective filtration to be performed at higher flow speeds (i.e. flow rate per unit cross-sectional area) than known filters, such as sand bed filters. By increasing the flow rate per unit cross-sectional area of the static filter pack, the cross-sectional area of the filter apparatus may be reduced while maintaining the flow rate through the filter pack. Thus, at least in certain embodiments, the size of the filter apparatus may be reduced compared to prior art systems.

The flow rate per unit cross-sectional area of the static filter pack is expressed in units of $m^3/m^2/h$ (i.e. the volume of liquid ($m^3$) for a given cross-sectional area of the filter ($m^2$) per hour (h)). The flow rate per unit cross-sectional area of the static filter pack corresponds to the volumetric flow rate through the static filter pack. The filter apparatus may be configured such that during filtration a flow rate per unit cross-sectional area of the static filter pack is greater than 65 $m^3/m^2/h$, 70 $m^3/m^2/h$ or 100 $m^3/m^2/h$. The filter apparatus may be configured such that during filtration a flow rate per unit cross-sectional area of the static filter pack in the range 60 $m^3/m^2/h$ to 550 $m^3/m^2/h$ exclusive. The filter apparatus may be configured such that during filtration a flow rate per unit cross-sectional area of the static filter pack in the range 60 $m^3/m^2/h$ to 150 $m^3/m^2/h$ exclusive. At least in certain embodiments, the filter apparatus may be configured during filtration to provide a flow rate per unit cross-sectional area of the static filter pack in the range 150 $m^3/m^2/h$ to 550 $m^3/m^2/h$; or 200 $m^3/m^2/h$ to 500 $m^3/m^2/h$; or 250 $m^3/m^2/h$ to 450 $m^3/m^2/h$; or 300 $m^3/m^2/h$ to 400 $m^3/m^2/h$; or 325 $m^3/m^2/h$ to 375 $m^3/m^2/h$. The filter apparatus may be configured during filtration to provide a flow rate per unit cross-sectional area of the static filter pack of approximately 350 $m^3/m^2/h$.

The filter apparatus may be used to filter liquid in an aquatic system comprising one or more container for containing a liquid. The one or more container may, for example, comprise one or more aquarium. The filter apparatus is configured to filter the liquid in said one or more container. For example, liquid in said one or more container may be cycled through said filter apparatus. The aquatic system may be a closed system and, at least during normal operation, the volume of liquid contained in said one or more container may remain substantially constant (subject to relatively small fluctuations, for example when the filter apparatus is backwashed). The one or more container may be adapted to contain a predetermined volume of liquid. The predetermined volume of liquid may, for example, be approximately equal to an internal volume of said one or more container. The filter chamber may be sized in proportion to the predetermined volume of liquid in said one or more container. The volume of the filter chamber may be determined by dividing the predetermined volume of liquid by a predefined numerical value n. The predefined numerical value n may be in the inclusive range 30 to 70; or 40 to 60; or 45 to 55. In certain embodiments, the predefined numerical value n may be 50. The numerical value n is a scaling factor which may define the relationship between the volume of the filter chamber and that of the predetermined volume of liquid to be filtered.

The filter apparatus is operable to perform filtration and backwashing. The backwashing may comprise draining the water in the filter chamber through a waste outlet. The filter apparatus may comprise means for introducing air into the filter chamber through one or more air inlets to agitate the filter elements during backwashing. In certain embodiments, the filter chamber may be substantially sealed and the air introducing means may configured to draw air into the filter chamber as liquid is drained from said filter chamber. The relatively small volume of the filter chamber of the filter apparatus described herein is advantageous since the volume of water sent to waste during backwashing cycle is relatively small. Thus, the frequency with which backwashing is performed may be increased compared to prior art filters. This is particularly advantageous if the filter apparatus is to be used to filter water from one or more aquarium as it has been determined that performing more frequent backwashing may help to reduce the accumulation of biological debris in the filter chamber. By performing backwashing more frequently, the accumulation of pathogens and/or algae and/or phosphates and/or nitrates in the water may be reduced. The filter apparatus described herein may be configured to be backwashed more than once a week. For example, a backwashing schedule may be implemented comprising two (2), three (3), four (4) or more backwashing operations each week. In certain applications, the filter apparatus described herein may be configured to be backwashed one or more times a day. For example, the filter apparatus may be configured to be backwashed two (2), three (3), four (4) or more times each day. The frequency with which the backwashing is performed may be fixed to maintain the concentration of nitrates (or indeed other contaminants) below a predetermined level, for example to maintain nitrates at less than 40 parts per million (ppm). This is advantageous in aquatic applications, for example to maintain the health and wellbeing of fish and other aquatic animals.

A backwashing schedule may be implemented automatically by an electronic control unit (ECU) configured to control the filter apparatus. The ECU may, for example, control one or more of the following: a drain valve actuator, an inlet valve actuator, an outlet valve actuator, and a check valve actuator. The ECU may be configured to control the filter apparatus to perform filtration and backwashing. To perform filtration, the ECU may be configured to control the drain valve actuator to close the drain valve; and/or the inlet valve actuator to open the inlet valve; and/or the outlet valve actuator to open the outlet valve. To perform backwashing, the ECU may be configured to control the drain valve actuator to open the drain valve; and/or the inlet valve actuator to close the liquid inlet; and/or the outlet valve actuator to close the liquid outlet.

The filter elements may have substantially neutral buoyancy, negative buoyancy or positive buoyancy.

According to a further aspect of the present invention there is provided a method of filtering a liquid, the method comprising:

establishing a flow of liquid through a static filter pack formed of a plurality of filter elements, the filter elements each having an open cell structure;

wherein the flow rate per unit cross-sectional area of the static filter pack is greater than 60 $m^3/m^2/h$. The method according to this aspect of the present invention maintains the flow rate per unit cross-sectional area of the static filter pack greater than 60 $m^3/m^2/h$ exclusive.

The flow rate per unit cross-sectional area of the static filter pack may be greater than 65 $m^3/m^2/h$, 70 $m^3/m^2/h$, 80 $m^3/m^2/h$, 90 $m^3/m^2/h$ or 100 $m^3/m^2/h$. The flow rate per unit cross-sectional area of the static filter pack may be in the range 60 $m^3/m^2/h$ to 550 $m^3/m^2/h$ exclusive. The flow rate per unit cross-sectional area of the static filter pack may be in the range 60 $m^3/m^2/h$ to 150 $m^3/m^2/h$ exclusive. The flow rate per unit cross-sectional area of the static filter pack may be in the range 150 $m^3/m^2/h$ to 550 $m^3/m^2/h$; or 200 $m^3/m^2/h$ to 500 $m^3/m^2/h$; or 250 $m^3/m^2/h$ to 450 $m^3/m^2/h$; or 300 $m^3/m^2/h$ to 400 $m^3/m^2/h$; or 325 $m^3/m^2/h$ to 375 $m^3/m^2/h$. The flow rate per unit cross-sectional area of the static filter pack may be approximately 350 $m^3/m^2/h$.

The method may comprise introducing air into the filter chamber through one or more air inlets to agitate the filter elements. The static filter pack may be formed in a filter chamber. The method may comprise allowing air to be drawn into the filter chamber as liquid is drained from the filter chamber.

According to a further aspect of the present invention there is provided an aquatic system comprising:

a filter apparatus comprising a filter chamber for containing a plurality of mechanical filter elements for forming a static filter pack to perform mechanical filtration of the liquid in said one or more container; and one or more container adapted to contain a predetermined volume of liquid;

wherein the volume of the filter chamber corresponds to said predetermined volume of liquid divided by a predefined numerical value n which is in the range 30 to 70 inclusive; or 40 to 60 inclusive; or 45 to 55 inclusive.

The one or more container may, for example, each comprise an aquarium. The predetermined volume of liquid may, for example, be approximately equal to an internal volume of said one or more container. The filter chamber is sized in proportion to the predetermined volume of liquid in said one or more container. The volume of the filter chamber corresponds to the predetermined volume of liquid divided by a predefined numerical value n.

The backwashing of the filter apparatus typically comprises draining the water in the filter chamber. The filter chamber may then be refilled from a suitable water supply, such as a mains supply, or from the body of water being filtered. It will be understood, therefore, that each backwashing results in a proportion of the water in the aquatic system being replaced. A weekly target is defined to replace between ten and twenty percent (10% to 20%) inclusive by volume of the water in the aquatic system has been determined as appropriate for preserving water quality. The frequency with which backwashing is performed may be controlled to achieve this weekly target. A lower target frequency for backwashing the filter apparatus each week may be calculated as one tenth of the predetermined volume of liquid in the one or more container divided by the volume of the filter chamber. An upper target frequency for backwashing the filter apparatus each week may be calculated as one fifth of the predetermined volume of liquid in the one or more container divided by the volume of the filter chamber. In a modified arrangement, the weekly target may be defined as five to fifteen percent (5% to 15%); or fifteen to twenty-five percent (15% to 25%).

By way of example, the aquatic system may comprise one or more aquarium. The one or more aquarium may be adapted to contain a total volume of approximately 400 litres of water. A predefined numerical value n of fifty (50) corresponds to a filter chamber having a volume of approximately eight (8) litres. This filter chamber may, for example, comprise mechanical filter elements having a volume of two (2) litres. In use, the filter chamber may comprise six (6) litres of water. The filter chamber may, for example, have a diameter of 100 mm and a vertical height of approximately 1100 mm. In use, the mechanical filter elements may form a static filter pack, as described herein. The aquatic system may be configured to provide a flow rate per unit cross-sectional area of the static filter pack in the range 300 $m^3/m^2/h$ to 400 $m^3/m^2/h$. More particularly, the aquatic system may be configured to provide a flow rate per unit cross-sectional area of the static filter pack of approximately 350 $m^3/m^2/h$. To maintain water quality, between approximately 40 and 80 litres of water should be replaced each week. This corresponds to a lower target frequency of seven backwashes each week; and an upper target frequency of eleven backwashes each week.

The mechanical filter elements may comprise mechanical filter elements having one or more filter cell. The one or more filter cell can have at least a first cell opening. The mechanical filter elements may be of the type described herein.

According to a further aspect of the present invention there is provided a mechanical filter apparatus comprising:

a filter chamber comprising a plurality of mechanical filter elements for forming a static filter pack to perform mechanical filtration of a liquid;

the mechanical filter apparatus is configured to generate a flow of the liquid through the mechanical filter elements during filtration to form the static filter pack. The mechanical filter elements may be of the type described herein The filter chamber can be at least substantially sealed. The filter chamber can be formed in a pressure vessel. The mechanical filter apparatus can be configured to perform filtration at a pressure greater than atmospheric.

The mechanical filter apparatus may comprise means for introducing air into the filter chamber to break up or disrupt the static filter pack during backwashing. The air introduction means may comprise an air supply conduit for supplying air to one or more outlets in the filter chamber. The one or more outlets may be disposed at, or proximal to the base of the filter chamber. The filter chamber may be at least substantially sealed and the air introduction means may be configured to draw air into the air supply conduit as water is drained from the filter chamber. The mechanical filter apparatus may comprise a valve for controlling fluid flow through the air supply conduit.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Unless indicated to the contrary, references herein to a cross-section of the filter chamber refer to a transverse cross-section extending perpendicular to a longitudinal axis of the filter chamber. At least in certain embodiments, the filter chamber may have cylindrical symmetry about said longitudinal axis. The longitudinal axis is typically arranged substantially vertically, but other arrangements may also be useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A filter system S incorporating a mechanical filter apparatus 1 in accordance with an embodiment of the present invention will now be described with reference to FIGS. 1 to 6. The mechanical filter apparatus 1 is operable to perform mechanical filtration of a liquid, typically water W. The water W is illustrated in the accompanying figures by hatching.

Figure 1:
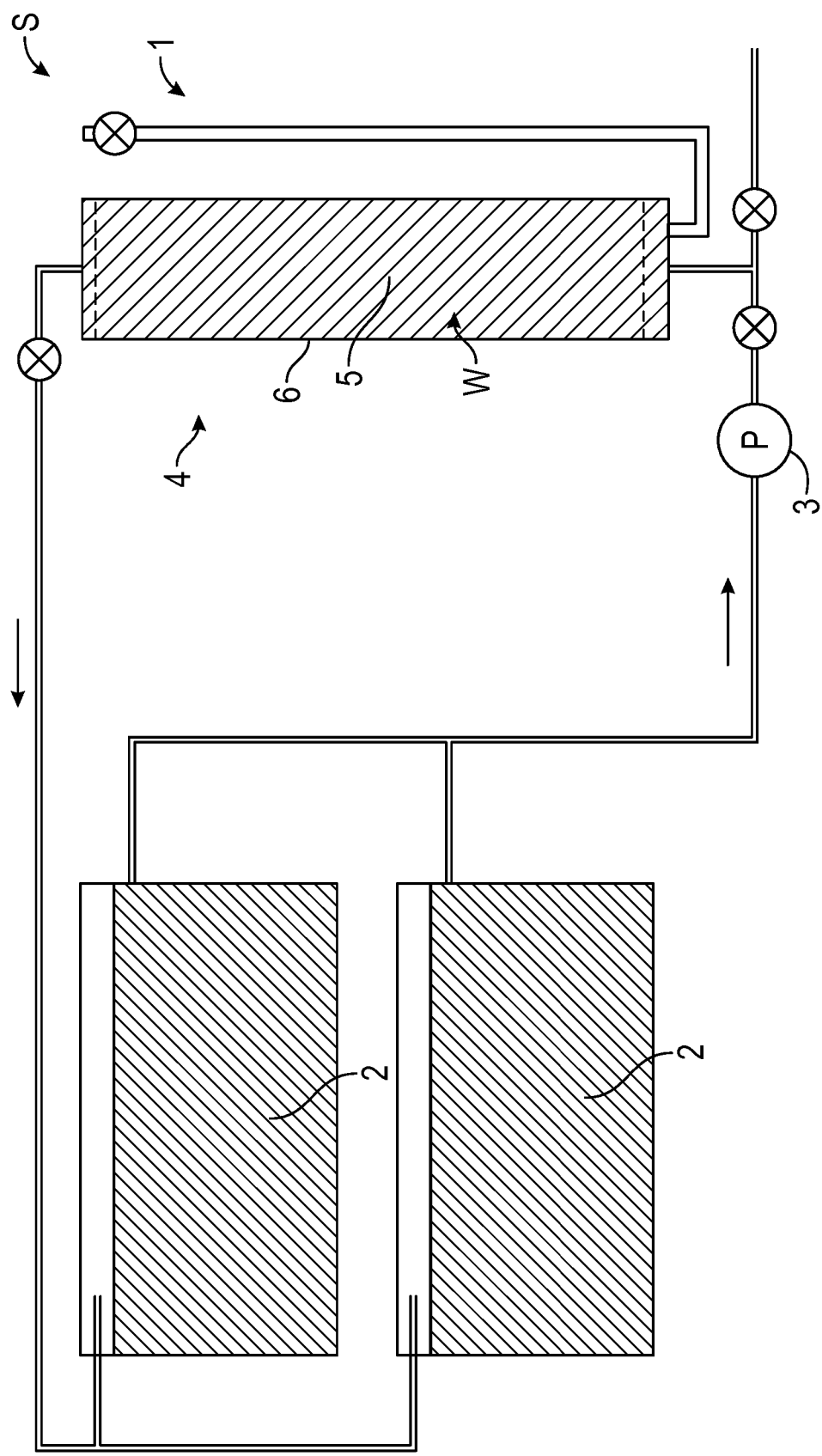
FIG. 1 shows a schematic representation of a filter system incorporating a mechanical filter apparatus 1 in accordance with an embodiment of the present invention.

In the filter system S shown schematically in FIG. 1, the mechanical filter apparatus 1 is configured to perform mechanical filtration of the water W in a pair of aquaria 2. The aquaria 2 in the illustrated arrangement are connected in parallel to the mechanical filter apparatus 1. The aquaria 2 may be installed in a commercial outlet, such as a pet store. It will be understood that the mechanical filter apparatus 1 could be used to filter water in two or more aquaria 2. The aquaria 2 could, for example, be arranged in a rack and arranged in one or more columns and/or rows. It will be appreciated that the mechanical filter apparatus 1 could be used to filter water in a single aquarium 2. The mechanical filter apparatus 1 can be used to perform filtration in other applications, for example to filter the water in a swimming pool.

A pump 3 is provided for pumping unfiltered water W from the aquaria 2 to the mechanical filter apparatus 1. The pump 3 is operable to pump unfiltered water W from the aquaria 2 to the mechanical filter apparatus 1. The water W is mechanically filtered and the filtered water W returned to the aquaria 2. The pump 3 is a variable speed pump in the present embodiment, but alternative embodiments may use a fixed speed pump. The pump 3 may be incorporated into the mechanical filter apparatus 1.

As shown in FIG. 2 and FIGS. 3A-D, the mechanical filter apparatus 1 comprises a filter housing 4 which defines a filter chamber 5 having a sidewall 6. The filter chamber 5 is a sealed chamber capable of supporting an operating pressure greater than atmospheric pressure. A plurality of filter elements 7 are disposed in the filter chamber 5 and collectively form a mechanical filter. As described herein, the mechanical filter apparatus 1 is operable to filter the water W; and to backwash the filter elements 7 to remove filtered material. The filter housing 4 comprises a tubular member 8 having a central longitudinal axis X-X arranged substantially vertically. The tubular member 8 defines the sidewall 6 of the filter chamber 5. The upper and lower ends of the tubular member 8 are sealed by an upper closure member 9 and a lower closure member 10 respectively to close the filter chamber 5. The tubular member 8 has a substantially uniform cross-section along the central longitudinal axis X-X. Thus, the filter chamber 5 in the present embodiment has a substantially constant profile along the central longitudinal axis X-X. In the present embodiment, the tubular member 8 is in the form of a cylinder having a circular cross-section (i.e. a right circular cylinder). The filter chamber 5 may have different cross-sections, for example elliptical, rectangular or square.

Figure 3A:
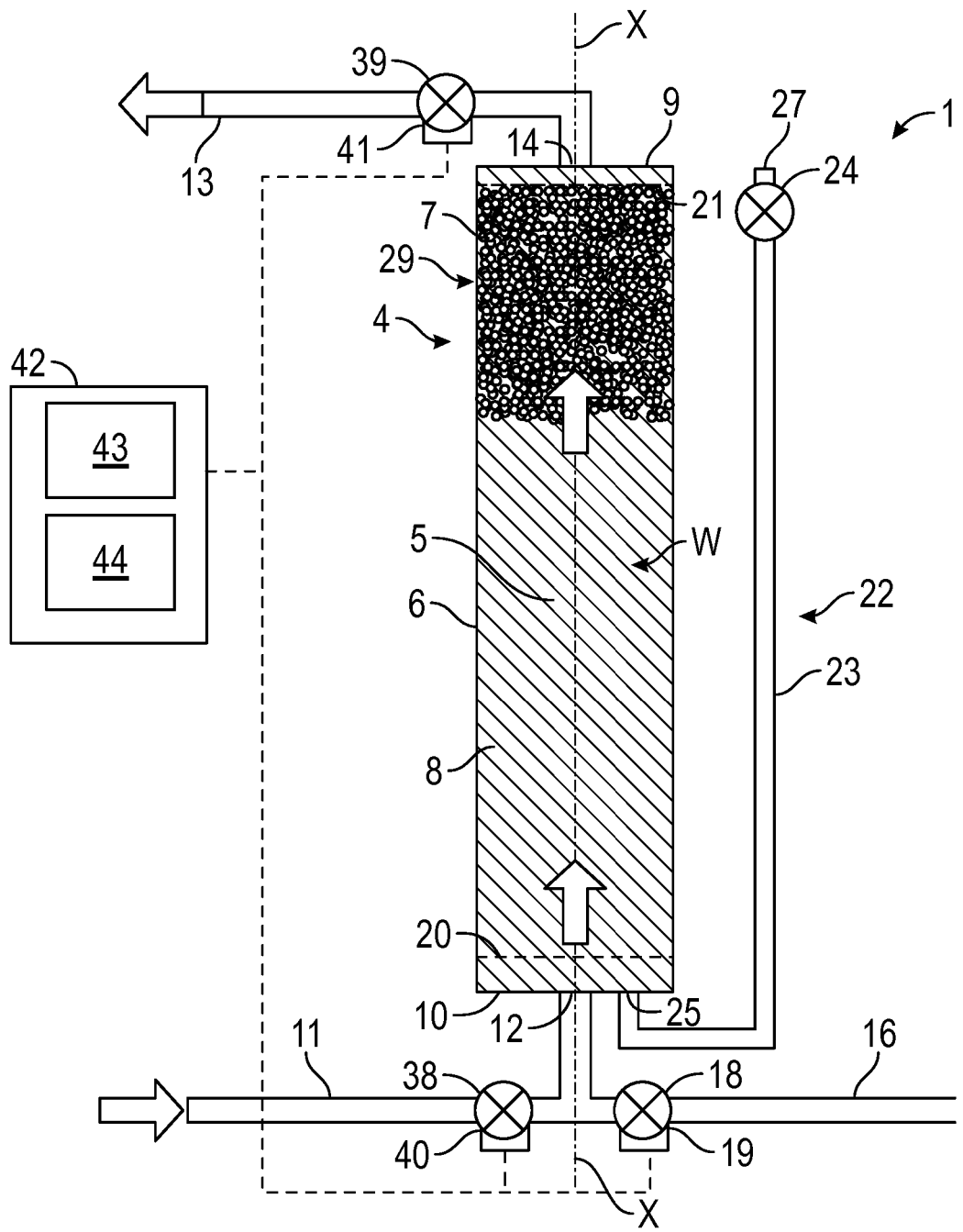
FIGS. 3A-D are schematic representations of the mechanical filter apparatus shown in FIG. 1 performing filtration and backwashing.

The mechanical filter apparatus 1 comprises a liquid supply conduit 11 for supplying unfiltered water from the aquaria 2 to a liquid inlet 12 formed in the filter chamber 5. The mechanical filter apparatus 1 also comprises a liquid return conduit 13 for returning filtered water from a liquid outlet 14 formed in the filter chamber 5 to the aquaria 2. In the present embodiment, an outlet of the liquid return conduit 13 is located above the level of the water W in each of the aquaria 2. It will be appreciated that the outlet of the liquid return conduit 13 may be located below the level of the water W in each of the aquaria 2. The liquid inlet 12 is formed in the lower closure member 10 and the liquid outlet 14 is formed in the upper closure member 9. During filtration, there is an up flow of water W through the filter chamber 5, as illustrated in FIG. 3A. The unfiltered water W is introduced through the liquid inlet 12 at the bottom of the filter chamber 5; and the filtered water W exits through the liquid outlet 14 at the top of the filter chamber 5. The filter chamber 5 is sealed and the operating pressure is greater than atmospheric pressure when the pump 3 supplies unfiltered water W to the filter chamber 5.

The mechanical filter apparatus 1 also comprises a drain conduit 16 for draining water from the filter chamber 5. The drain conduit 16 may, for example, be connected to waste or to a sump for collecting waste water. In the present embodiment, the drain conduit 16 is connected to the liquid supply conduit 11 such that the filter chamber 5 is drained through the liquid inlet 12. In alternative embodiments, a separate drain outlet (not shown) may be provided, for example at the bottom of the filter chamber 5. A drain valve 18 is provided for selectively opening and closing the drain conduit 16. The drain valve 18 could be manually operated, for example by operating a control lever. In the present embodiment, the drain valve 18 is actuated by a drain valve actuator 19, for example a first electromechanical actuator, such as a solenoid. An inlet mesh 20 and an outlet mesh 21 are provided to retain the filter elements 7 in the filter chamber 5.

The mechanical filter apparatus 1 comprises means for introducing air into the filter chamber 5. The air introduction means (denoted generally by the reference numeral 22) comprises an air supply conduit 23 and a check valve 24. The air supply conduit 23 is connected to one or more air inlets 25 for introducing air into the filter chamber 5. As described herein, the air supply conduit 23 is configured to enable air to be drawn into the filter chamber 5 through the air inlets 25 by the reduced pressure in the filter chamber 5 caused by the water W draining from the filter chamber 5. The air supply conduit 23 extends vertically and has an air intake 27 disposed at the top of the filter housing 4 above the filter chamber 5. In the present embodiment the check valve 24 is disposed at or proximal to the air intake 27. The air inlets 25 may be formed in one or more distribution conduits (not shown) disposed at the base of the filter chamber 5, for example extending radially outwardly from a central manifold. The check valve 24 enables one-way flow through the air supply conduit 23. In particular, the check valve 24 is configured to allow air to enter the air supply conduit 23 and to prevent water exiting through the air supply conduit 23. The check valve 24 may, for example, comprise a spring-biased closure member or a closure flap (not shown) configured to open to allow air to be drawn into the air supply conduit 23 and to close to prevent water W exiting through the air supply conduit 23. The check valve 24 may, for example, comprise a ball for locating in a valve seat to seal the air supply conduit 23. In an alternative embodiment, the check valve 24 may be replaced with a valve member which may be selectively opened and closed. In alternative embodiments, the check valve 24 may comprise an electromechanical actuator, such as a solenoid, for opening and closing the air supply conduit 23.

Figure 2:
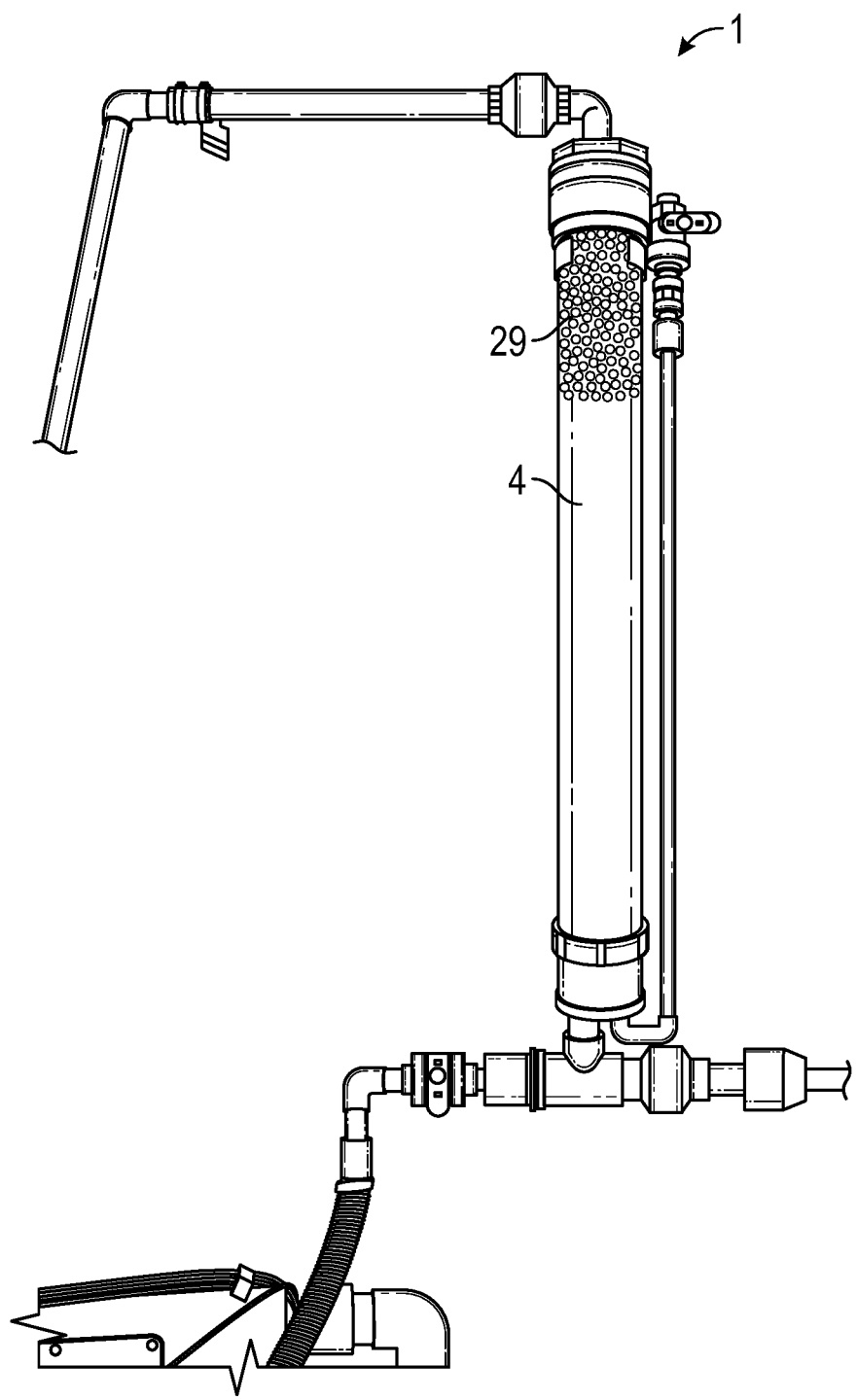
FIG. 2 is a photograph of the mechanical filter apparatus 1 shown in FIG. 1.

As outlined above, a plurality of filter elements 7 are disposed in the filter chamber 5. When the water W is introduced into the filter chamber 5, the filter elements 7 form a filter pack 29. In the present embodiment, the filter elements 7 have substantially neutral buoyancy and, due to the upwards flow of the water W through the filter chamber 5, the filter pack 29 forms at the top of the filter chamber 5, as illustrated in FIGS. 2 and 3A. The filter elements 7 disposed in the filter chamber 5 may have a neutral buoyancy or a positive buoyancy in water. The flow of water W through the filter chamber 5 compacts the filter elements 7 together at the top of the filter chamber 5 and forms the filter pack 29; the movement of the filter elements 7 within the filter pack 29 is restricted. The resulting filter pack 29 is substantially static and is suitable for performing mechanical filtration of the water W.

Figure 4:
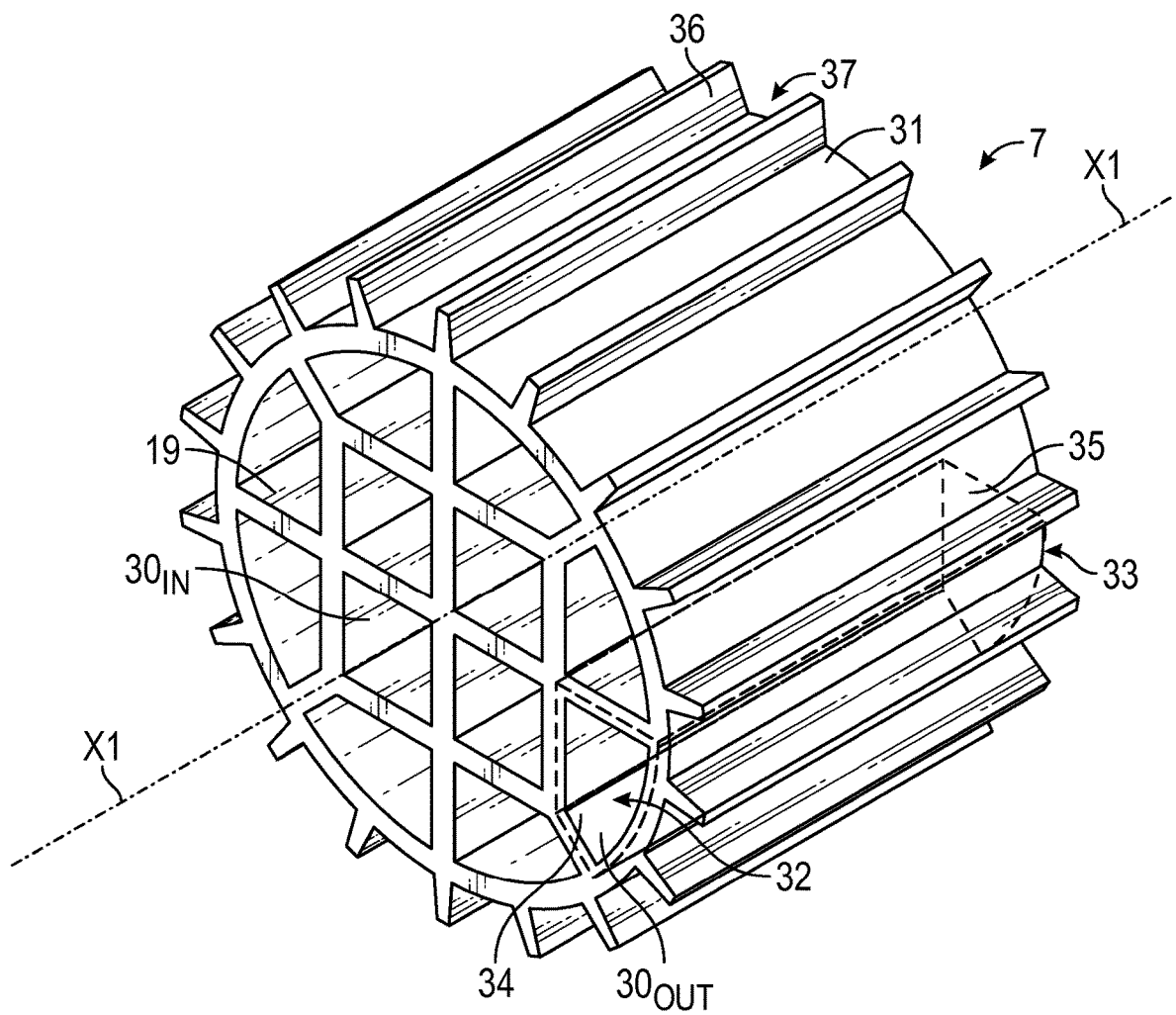
FIG. 4 is a perspective view of a filter element used in the mechanical filter apparatus according to the present invention.

With reference to FIG. 4, 5, 6A and 6B, the filter elements 7 have an open cell structure. In particular, the filter elements 7 each comprise one or more filter cells 30. The filter elements 7 comprise a cylindrical wall 31 which is open at each end. The cylindrical wall 30 has a central longitudinal axis X-X and a substantially circular profile. The filter elements 7 each comprise a plurality of filter cells 30. The filter cells 30 are open cells for trapping particulates and other debris suspended in the unfiltered water W to perform mechanical filtration. The filter cells 30 are elongated and in the present embodiment form conduits extending along the length of the filter element 7. As shown in FIG. 4 the filter cells 30 each have a first end 32 and a second end 33. A first cell opening 34 is formed at said first end 32 and a second cell opening 35 is formed at said second end 33. Thus, the first and second ends of each filter cell 30 are both open. In a variant, the filter cells 30 could be open at the first end 32 and closed at the second end 33. In a further variant, the first and second ends 32, 33 of the conduit could both be open, but an intermediate closure wall could be disposed between the first and second ends 32, 33 to form separate filter cells 30 separated from each other by the intermediate closure wall. The term "open cell filter element" is used herein to define the filter element 7. Further details of suitable filter elements 7 are disclosed in the Applicant's International patent application number PCT/GB2016/000101 filed on 16 May 2016, the contents of which are incorporated herein in their entirety by reference. It will be understood that other types of filter element 7 may be used in the filter apparatus 1 described herein.

Figure 5:
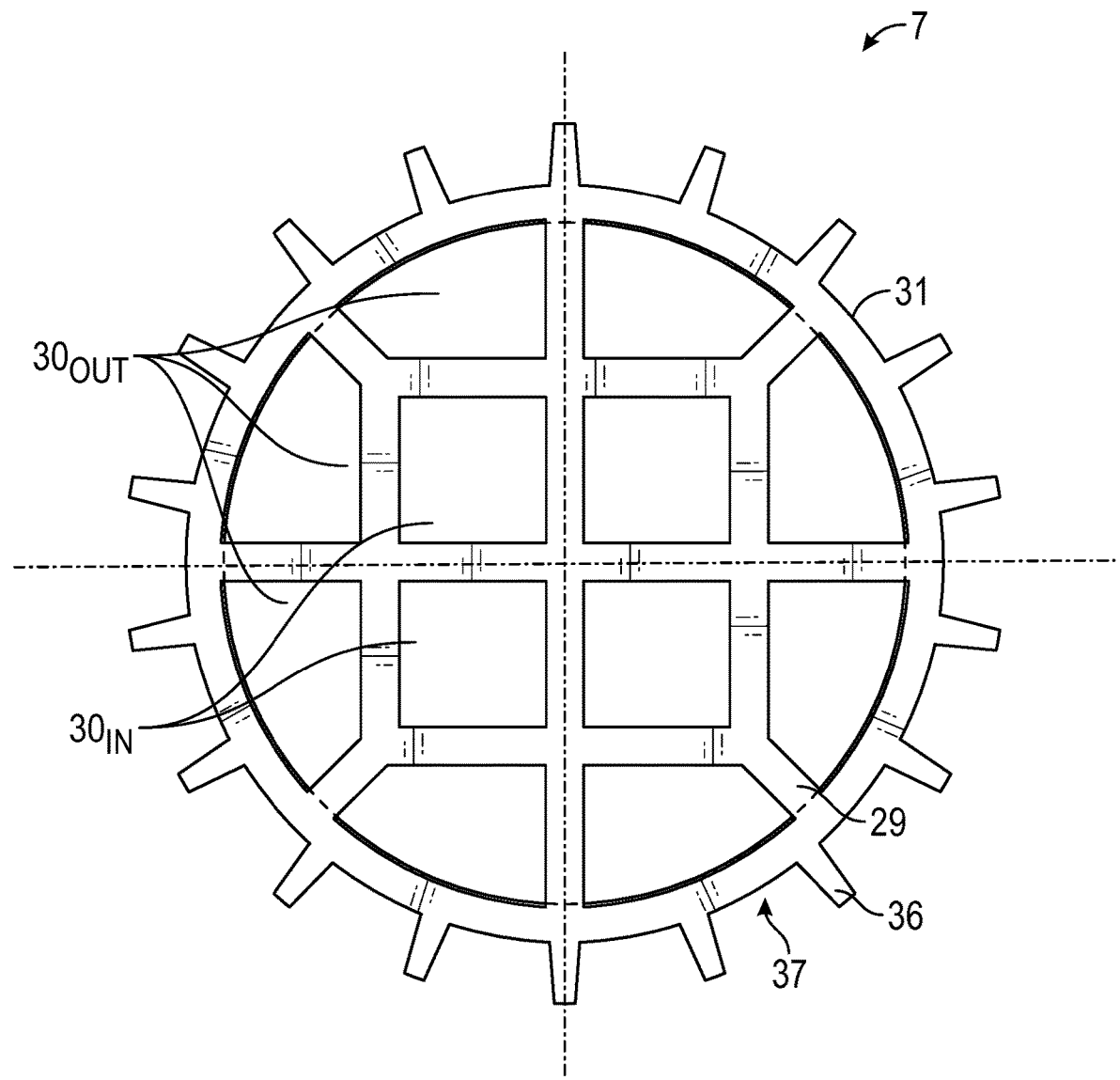
FIG. 5 is an end view of the filter element shown in FIG. 4.
Figure 6A:
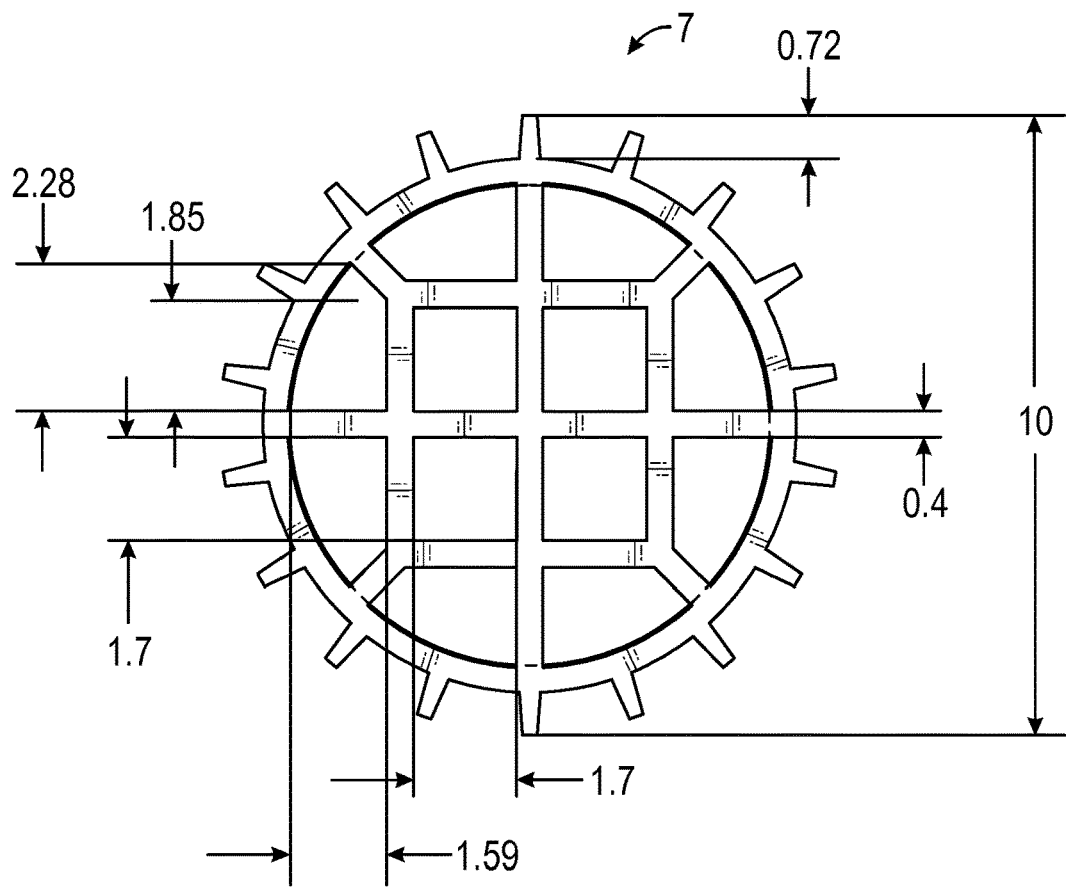
FIGS. 6A and 6B are end and side elevations showing exemplary dimensions of the filter element shown in FIGS. 4 and 5.
Figure 6B:
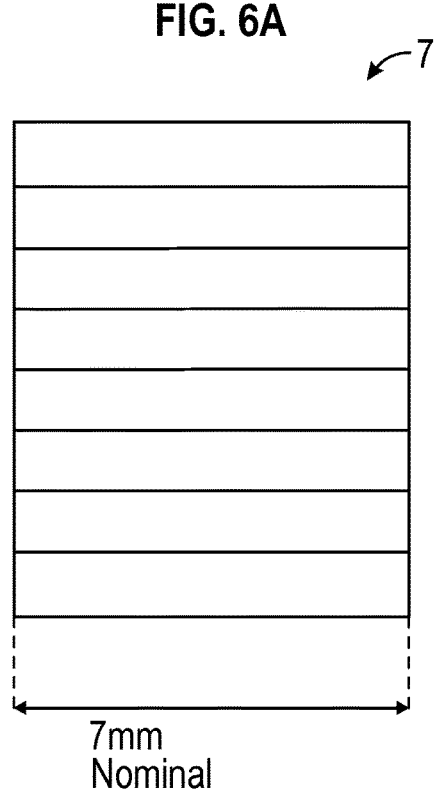

As shown in FIGS. 4 and 5, the filter elements 7 according to the present embodiment each comprise inner filter cells 30IN and outer filter cells 30OUT; the outer filter cells 30OUT being disposed radially outside the inner filter cells 30IN. The filter elements 7 comprise a plurality of external ribs 36 extending radially outwardly from the cylindrical wall 31. The external ribs 36 are arranged to form a series of filter channels 37 which are open along their length and may also perform mechanical filtration when the filter elements 7 form the filter pack 29. As shown in FIGS. 6A and 6B, the filter elements in the present embodiment have an external width of approximately 10 mm and a length of approximately 7 mm. The diameter of the cylindrical wall 31 is approximately 8.5 mm. The inner filter cells 30IN have a square profile measuring 1.7 mm×1.7 mm; and the outer filter cells 30OUT have a major width of 2.28 mm and a minor width of 1.59 mm. The inner and outer filter cells 30IN, 30OUT in the present embodiment each have a cross-sectional area less than 3 mm$^2$.

The mechanical filter apparatus 1 comprises flow control means for controlling the supply of unfiltered water W from the aquaria 2 to the filter chamber 5; and the return of filtered water W from the filter chamber 5 to the aquaria 2. In the present embodiment, the flow control means comprises a liquid supply valve 38 and a liquid return valve 39. The liquid supply valve 38 is operative to open and close the liquid supply conduit 11 to control the supply of unfiltered water W to the filter chamber 5. The liquid return valve 39 is operative to open and close the liquid return conduit 13 to control the return of filtered water W to the aquaria 2. The liquid supply valve 38 and the liquid return valve 39 can both be closed at least substantially to seal the filter chamber 5. A liquid supply valve actuator 40, for example a second electromechanical actuator, is provided for actuating the liquid supply valve 38. A liquid return valve actuator 41, for example a third electromechanical actuator, is provided for actuating the liquid return valve 39. In alternative embodiments, the liquid supply valve 38 and/or the liquid return valve 39 may be operated manually. In alternate embodiments the flow control means may comprise a control valve for controlling the flow of liquid through the liquid supply conduit 11 and the liquid return conduit 13. The control valve may be a multi-port valve, for example a 4-way valve. The control valve could be configured also to control operation of the drain valve 18.

As shown schematically in FIG. 3A, the mechanical filter apparatus 1 comprises an electronic control unit (ECU) 42 for controlling operation of the pump 3, the drain valve 18, the liquid supply valve 38 and the liquid return valve 39. The ECU 42 comprises a processor 43 and a memory 44. The processor 43 is configured to control operation of the drain valve actuator 19, the liquid supply valve actuator 40 and the liquid return valve actuator 41. The ECU 42 may thereby configure the mechanical filter apparatus 1 to perform either filtration or backwashing. In the present embodiment the ECU 42 implements a timer to control switching between filtration and backwashing. The time between backwashing cycles may, for example, be user-configurable. Other control strategies could be used to initiate backwashing, for example in dependence on a detected change in the load on the pump 3. The ECU 42 may optionally also control operation of the check valve 24 to open and close the air supply conduit 23. The ECU 42 may optionally be configured to implement a failsafe control strategy whereby operation of the pump 3 is inhibited when the drain valve 18 is open. The failsafe control strategy may avoid accidental draining of the water in the aquaria 2 by continuing to operate the pump 3 when the drain valve 18 is open.

Alternatively, or in addition, a water level sensor may be provided to output a level signal to the ECU 42 to indicate a level of the water in the filter chamber 5. The level signal may provide an indication that the water in the filter chamber 5 is at or below a predetermined level, for example to indicate that backwashing is complete. The ECU 42 may be configured to close the drain valve 18 when the level signal indicates that the water level is at or below the predetermined level. The ECU 42 may control switching between backwashing and filtration in dependence on the level signal received from the water level sensor.

The operation of the mechanical filter apparatus 1 will now be described with reference to FIGS. 3A-D. The mechanical filter apparatus 1 is illustrated in FIG. 3A filtering the water W from the aquaria 2. To perform filtration, the ECU 42 controls the liquid supply valve actuator 40 to open the liquid supply valve 38; and the liquid return valve actuator 41 to open the liquid return valve 39. The ECU 42 activates the pump 3 to supply unfiltered water W from the aquaria 2 to the filter chamber 5. The ECU 42 also controls the drain valve actuator 19 to close the drain valve 18. The pump 3 supplies unfiltered water W into the filter chamber 5 and establishes an up flow of water W through the filter pack 29. The unfiltered water W is mechanically filtered as it passes through the filter pack 29 and filtered water W exits the filter chamber 5 through the liquid outlet 14. The filter elements 7 perform mechanical filtration by trapping particulates and other material suspended in the water W. The filtered water W is returned to the aquaria 2 through the liquid return conduit 13. The material filtered from the water W may be held between the filter elements 7 forming the filter pack 29, within the open filter cells 30 of each filter element 7 and within the filter channels 37. The outlet mesh 21 prevents the filter elements 7 entering the liquid return conduit 13.

Figure 3B:
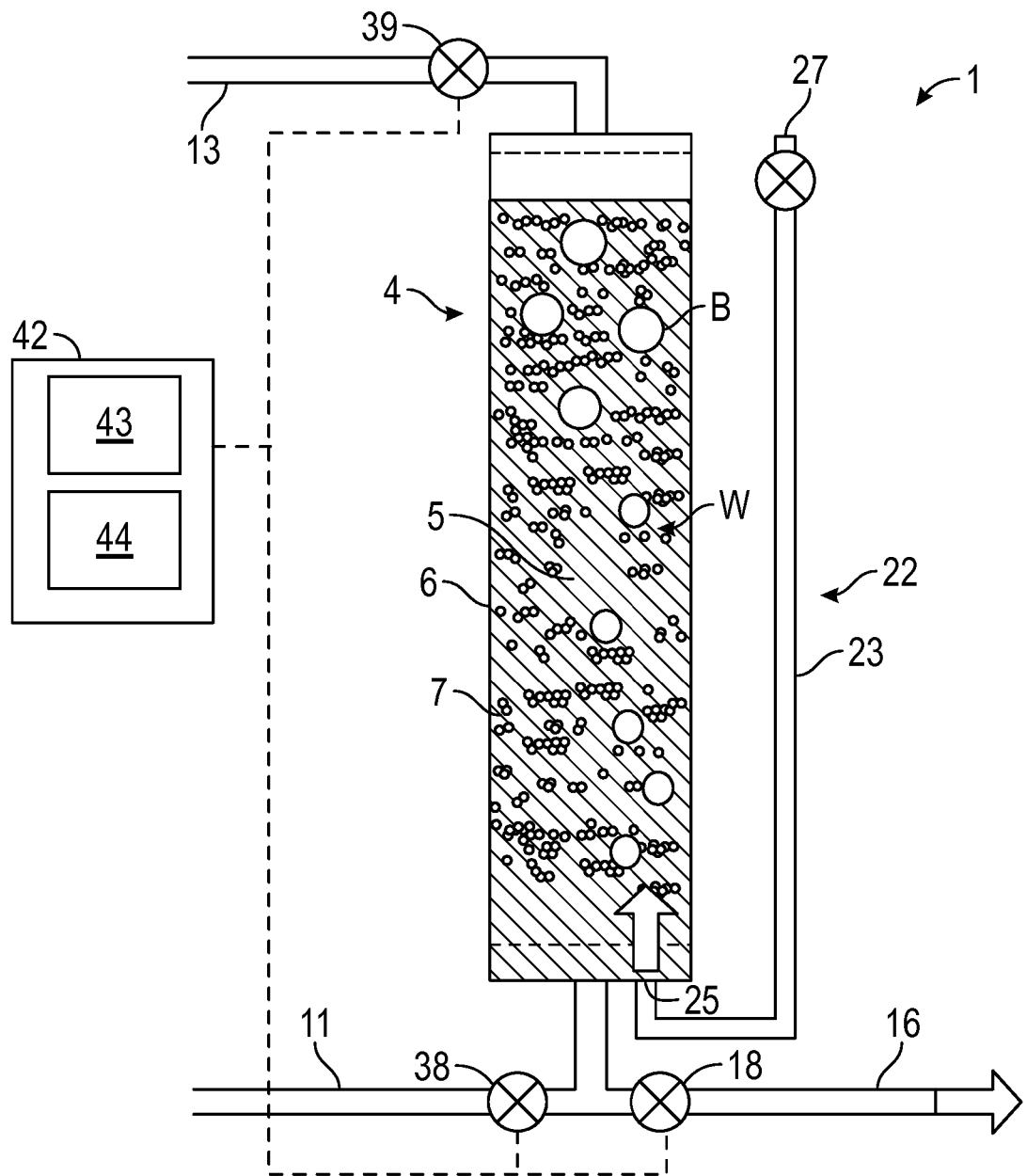
Figure 3C:
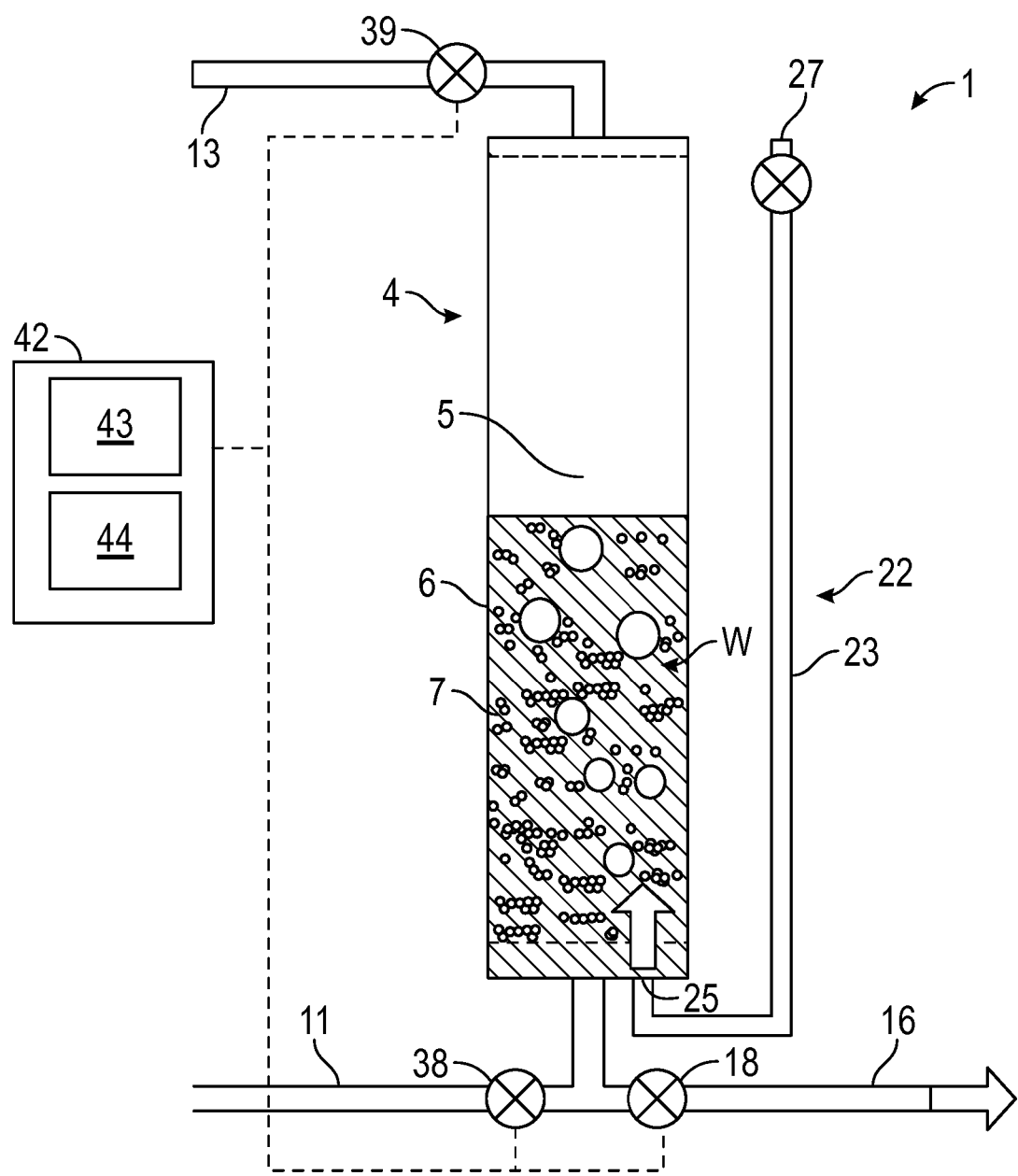
Figure 3D:
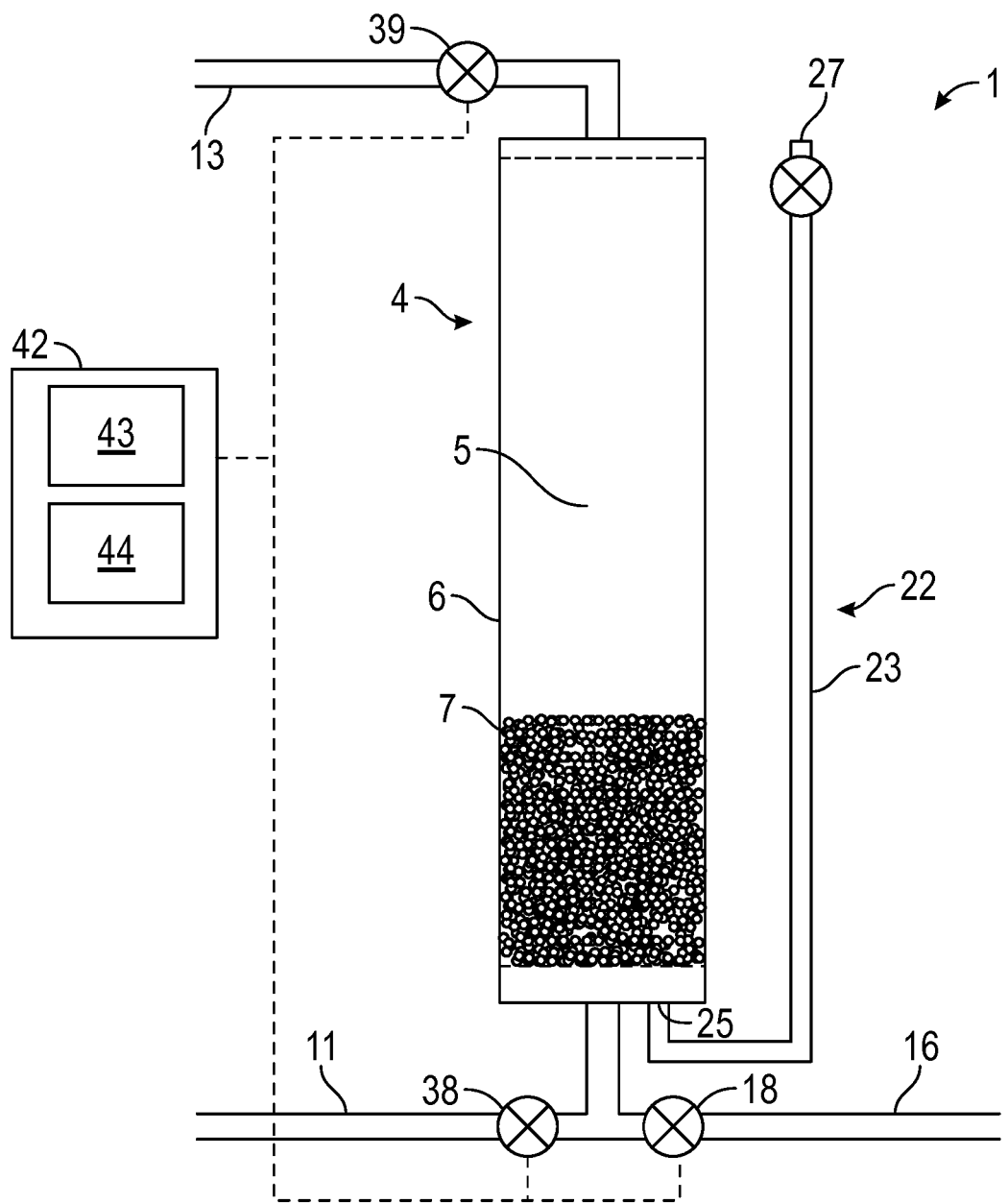

As shown in FIGS. 3B-D, the mechanical filter apparatus 1 is periodically backwashed to dislodge filtered material and to clean the filter elements 7. To perform backwashing, the ECU 42 deactivates the pump 3; controls the liquid supply valve actuator 40 to close the liquid supply valve 38; and controls the liquid return valve actuator 41 to close the liquid return valve 39. The filter chamber 5 is thereby sealed and the supply of water W inhibited. The ECU 42 then controls the drain valve actuator 19 to open the drain valve 18 to allow the water W in the filter chamber 5 to exit through the drain conduit 16 and to flush filtered particulates from the mechanical filter apparatus 1. As illustrated in FIG. 3B, the water W flowing out of the sealed filter chamber 5 causes a drop in operating pressure within the filter chamber 5 to less than atmospheric pressure. The reduced pressure in the filter chamber 5 causes the check valve 24 to open and draws air into the filter chamber 5 through the air inlets 25 via the air supply conduit 23. The air entering the filter chamber 5 forms a plurality of bubbles B which rise to the top of the water W in the filter chamber 5. The air bubbles B rise through the water W and agitate the filter elements 7, helping to break up the filter pack 29. As shown schematically in FIG. 3C, air continues to be drawn into the filter chamber 5 as the water W flows through the drain conduit 16. The continuous agitation of the filter elements 7 during backwashing helps to dislodge filtered material, for example displacing particulates trapped in the filter cells 30 and the filter channels 37. It will be appreciated that the water W in the filter chamber 5 continues to drain through the drain conduit 16, such that the level of the water W continues to drop, drawing more air through the air supply conduit 23 and causing further agitation of the filter elements 7 within the filter chamber 5. By agitating the filter elements 7, material and debris filtered by the filter elements 7 is dislodged and returned to the water W within the filter chamber 5. Since the filter chamber 5 has a substantially continuous section, the agitation of the filter elements 7 is more uniform throughout backwashing than prior art systems incorporating a constriction into the sidewall of the filter chamber. In certain embodiments, the pump 3 may continue to supply water to the filter chamber 5 during backwashing.

The introduction of air into the filter chamber 5 continues concurrently with drainage of the water W from the filter chamber 5. By draining the water W through the drain conduit 16, the material and debris is expelled from the filter chamber 5. The filter elements 7 may thereby be cleaned ready to perform filtration. The agitation of the filter elements 7 continues until the water level in the filter chamber 5 drops below the height of the air inlets 25 or the filter chamber 5 is empty. The level of the water W drops below the height of the air inlets 25 and air is drawn freely into the filter chamber 5. The pressure in the filter chamber 5 returns to atmospheric pressure and the check valve 24 closes. As shown schematically in FIG. 3D, when the filter chamber 5 is completely drained, the filter elements 7 settle at the bottom of the filter chamber 5. The inlet mesh 20 prevents the filter elements 7 entering the drain conduit 16.

Once the water W has drained to waste and the filter chamber 5 is empty, the ECU 42 controls the liquid supply valve 38 to open the liquid supply conduit 11; and the liquid return valve 39 to open the liquid return conduit 13. The drain valve 18 is operated to close the drain conduit 16 and the pump 3 is re-started. The pump 3 supplies unfiltered water W such that the filter chamber 5 is partially or completely re-filled with unfiltered water W. The drain valve 18 may be held open after opening the liquid supply valve 38 such that additional washing of the filter elements 7 may be performed and the water flushed directly to waste through the drain conduit 16. In alternative arrangements, the drain valve 18 may be closed before or concurrent with opening of the liquid return conduit 13. The backwashing may optionally be performed more than once. For example the filter chamber 5 may be partially or completely re-filled, the liquid return conduit 13 closed and the drain valve 18 re-opened. The backwashing of the filter elements 7 is the same as described above, as air is drawn into the filter chamber 5 to form bubbles B which agitate the filter elements 7.

When backwashing is complete, the liquid supply valve 38 is operated to open the liquid supply conduit 11; and the liquid return valve 39 is operated to open the liquid return conduit 13. The pump 3 is re-started to pump water from the aquaria 2 into the filter chamber 5. The drain valve 18 is operated to close the drain conduit 16 and the filter chamber 5 is refilled with unfiltered water W. The filter elements 7 re-form the filter pack 29 and are operative to perform mechanical filtration of the water W since it flows upwardly through the filter chamber 5. The filtered water W is returned to the aquaria 2 through the liquid return conduit 13. In a modified embodiment, after backwashing, the ECU 42 may be configured to control the pump 3 to gradually increase the speed of the water W supplied to the filter chamber 5. The speed of the water W may be increased in steps or as a continuous curve (such as a logarithmic curve). By increasing the speed of the water W gradually, the uniformity of the filter pack formed by the filter elements 7 may be more improved.

The ECU 42 allows the filtration and backwashing of the filter elements 7 to be partially or completely automated. The ECU 42 may, for example, implement a timer circuit for controlling filtration and backwashing. The timer circuit may be user-configurable, for example to enable a user to specify backwashing frequency. At least in certain embodiments the air introducing means 22 provides an effective mechanism for agitating the filter elements 7. The combination of the air introducing means 22 and the open cell filter elements 7 is believed to be particularly advantageous as some of the air bubbles B may dislodge material trapped within the filter cells 30. Furthermore, at least in certain embodiments, the open cell structure may reduce the mass of the filter elements 7 and allow them to be agitated more readily by the air bubbles. This is particularly advantageous as the filter chamber 5 can be formed with a substantially uniform cross-section. In the present embodiment, the filter housing 4 comprises a tubular member 8 in the form of a right circular cylinder to form the filter chamber 5. Thus, the filter housing 4 is formed without constrictions or narrowing sections intended to promote agitation of the filter elements 7 during backwashing.

By way of example, the mechanical filter apparatus 1 in accordance with the present invention may comprise a tubular member 8 having a diameter of approximately 100 mm and a vertical height of approximately 1100 mm. The filter chamber 5 formed in said tubular member 8 may have a volume of approximately eight (8) litres. In use, the filter chamber may contain approximately six (6) litres of water W and approximately two (2) litres by volume of said filter elements 7. The volume of the filter chamber 5 is proportional to the volume of liquid that can be filtered by the mechanical filter apparatus 1. It has been determined that the volume of the filter chamber 5 may correspond to the total volume of liquid to be filtered divided by a predefined numerical value n. The predefined numerical value n is typically in the range forty-five (45) to fifty-five (55) inclusive and in the present embodiment is fifty (50). Thus, the mechanical filter apparatus 1 according to the present exemplary embodiment can be used to filter approximately 400 litres (n*filter chamber volume) of water. The combined volume of the water in the aquaria 2 in the present embodiment should be approximately 400 litres. In use, a flow rate per unit cross-sectional area of the static filter pack in the filter chamber 5 should be in the range 300 $m^3/m^2/h$ to 400 $m^3/m^2/h$. In the present embodiment, the flow rate through the mechanical filter apparatus 1 is approximately 3000 litres/hour (3 $m^3/h$). The flow rate per unit cross-sectional area of the static filter pack is therefore approximately 350 $m^3/m^2/h$. It will be understood that the dimensions of the mechanical filter apparatus 1 and/or the flow rate per unit cross-sectional area may be modified in alternate embodiments.

In use, the mechanical filter apparatus 1 is periodically backwashed. During backwashing, the water W in the filter chamber 5 is drained through the drain valve 18. In the present exemplary embodiment, each backwashing operation results in approximately 6 litres of the water W being drained. Fresh water is subsequently introduced into the filter system S to refill the filter chamber 5, thereby maintaining the water level in the aquaria 2. It will be appreciated that each backwashing operation and the associated refilling of the filter chamber 5 results in a proportion of the water W in the aquaria 2 being replaced. A weekly target of replacing 10-20% by volume of the water W in the aquaria 2 has been determined as appropriate for preserving water quality for fish and other aquatic animals. In the present embodiment, this corresponds to replacing between 40 and 80 litres of water each week. As approximately 6 litres is drained from the filter chamber 5 during each backwashing operation, this corresponds to between seven (7) and eleven (11) backwashing operations each week. The filter system S may, for example, be configured to backwash the mechanical filter apparatus 1 ten (10) times each week. The ECU 42 may be configured to implement a backwashing schedule determined using this technique. Other backwashing schedules may be implemented.

In alternative embodiments of the present invention, the tubular member 8 may taper outwardly towards its base, for example to form a truncated cone or pyramid. This arrangement would provide additional space for the filter elements 7 to move within the filter chamber 5 as the water W drains through the drain conduit 16. It is believed that this may increase the movement of the filter elements 7 and promote cleaning during backwashing. At least in certain embodiments the tubular member 8 may comprise a substantially continuous taper along said longitudinal axis X1-X1 (i.e. free from step changes in its cross-section).

The above embodiment of the mechanical filter apparatus 1 is configured to establish an up flow of water through the filter chamber 5 during filtration. It will be appreciated that the mechanical filter apparatus 1 could be configured to generate a down flow of water through the filter chamber 5 during filtration. In particular, the relative positioning of the liquid inlet 12 and the liquid outlet 14 would be reversed such that the liquid inlet 12 is disposed in an upper portion of the filter chamber 5 and the liquid outlet 14 is disposed in a lower portion of the filter chamber 5. The filter elements 7 may have neutral buoyancy or negative buoyancy in the water W. During filtration, the filter pack 29 would form at the bottom of the filter chamber 5. During backwashing, the air introducing means 22 would introduce air into the bottom of the filter chamber 5 to agitate the filter elements 7 and break up the filter pack 29. The filter housing 4 may comprise a tubular member 8 to form the filter chamber 5. The tubular member 8 may have a substantially uniform cross profile along its longitudinal axis X-X. The tubular member 8 may, for example, have a circular cross profile (i.e. a right circular cylinder). Again, the filter housing 4 may be formed without constrictions or narrowing sections intended to promote agitation of the filter elements 7 during backwashing. In a variant, the filter elements 7 may have positive buoyancy and, due to the increased flow speed of the water W, the static filter pack may still form in the filter chamber 5.

A filter system S incorporating a mechanical filter apparatus 1 in accordance with a further embodiment of the present invention will now be described with reference to FIGS. 7 and 8. The filter system S is a modified version of the embodiment described herein with reference to FIGS. 1 to 6. Like reference numerals are used for like components.

Figure 7:
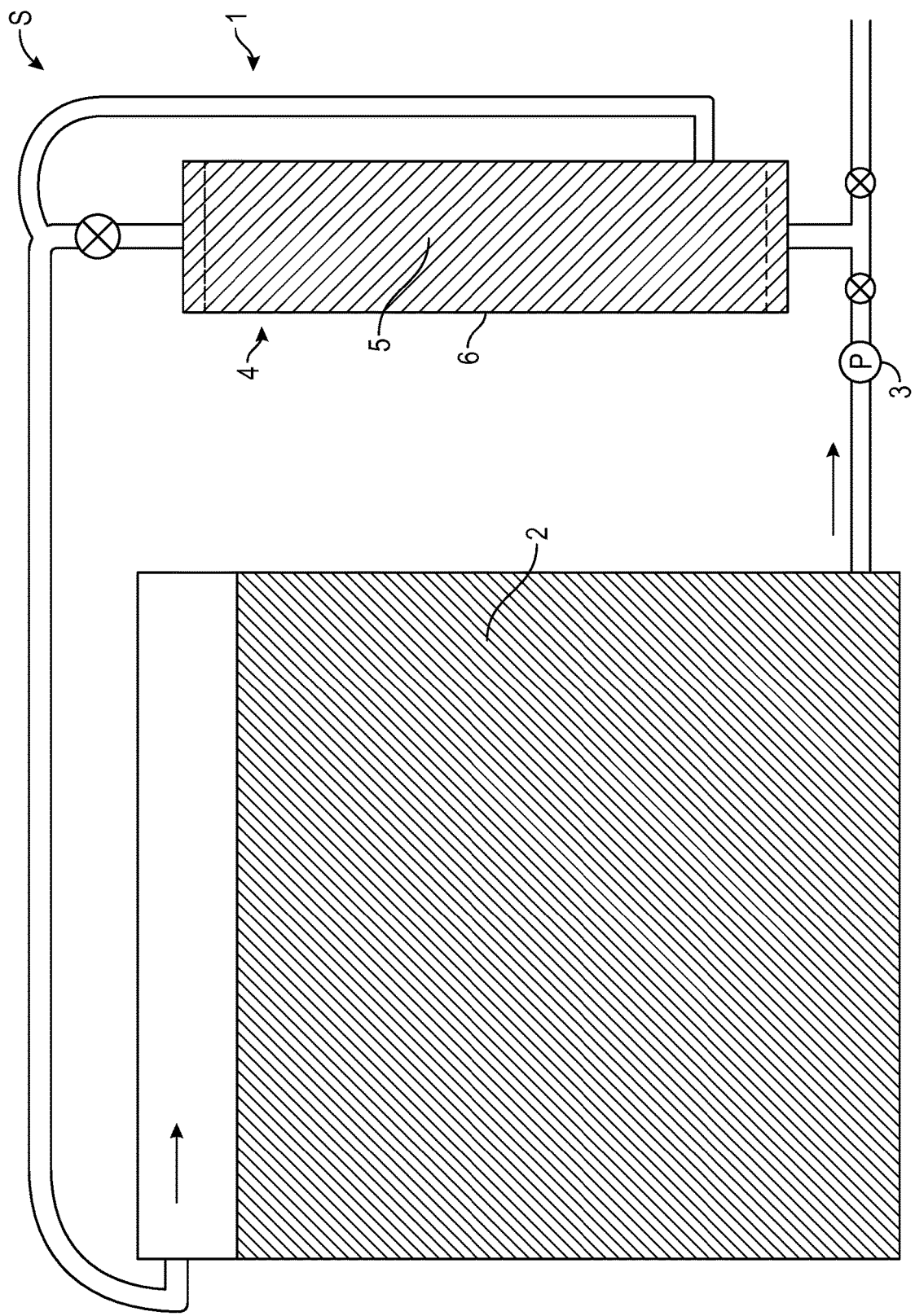
FIG. 7 shows a schematic representation of a filter system incorporating a mechanical filter apparatus 1 in accordance with a further embodiment of the present invention.

As shown schematically in FIG. 7, the filter system S according to the present embodiment is configured to filter the water W in a swimming pool 2. A pump 3 is provided for pumping unfiltered water W from the swimming pool 2 to the mechanical filter apparatus 1. The water W is mechanically filtered and the filtered water W returned to the swimming pool 2. The filter water W is returned to the swimming pool 2 through a liquid return conduit 13 having an outlet disposed above the level of the water in the swimming pool 2. The pump 3 may be incorporated into the mechanical filter apparatus 1.

Figure 8:
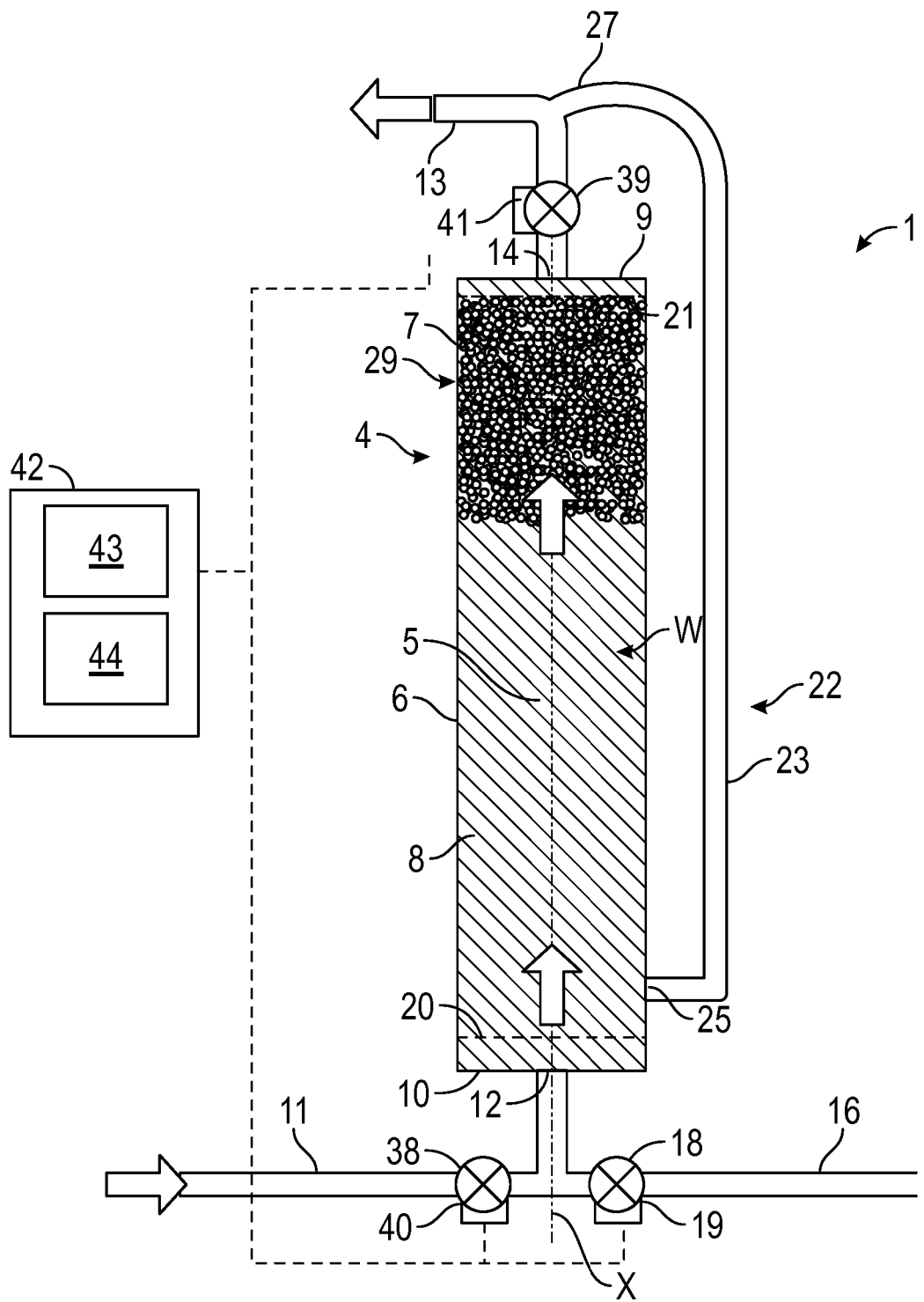
FIG. 8 is a schematic representation of the mechanical filter apparatus incorporated into the filter system shown in FIG. 7.

As shown in FIG. 8, the mechanical filter apparatus 1 comprises a filter housing 4 which defines a filter chamber 5 having a sidewall 6. The filter chamber 5 is a sealed chamber capable of supporting an operating pressure greater than atmospheric pressure. A plurality of filter elements 7 are disposed in the filter chamber 5 and collectively form a mechanical filter. The filter elements 7 have an open-cell structure. By way of example, the mechanical filter apparatus 1 may comprise filter elements 7 of the type described herein with reference to FIGS. 4, 5, 6A and 6B. As described herein, the mechanical filter apparatus 1 is operable to filter the water W; and to backwash the filter elements 7 to remove filtered material. The filter housing 4 comprises a tubular member 8 having a central longitudinal axis X-X arranged substantially vertically. The tubular member 8 defines the sidewall 6 of the filter chamber 5. The upper and lower ends of the tubular member 8 are sealed by an upper closure member 9 and a lower closure member 10 respectively to close the filter chamber 5. The tubular member 8 has a substantially uniform cross-section along the central longitudinal axis X-X. Thus, the filter chamber 5 in the present embodiment has a substantially constant profile along the central longitudinal axis X-X. In the present embodiment, the tubular member 8 is in the form of a cylinder having a circular cross-section (i.e. a right circular cylinder). The filter chamber 5 may have different cross-sections, for example elliptical, rectangular or square.

The mechanical filter apparatus 1 comprises a liquid supply conduit 11 for supplying unfiltered water from the swimming pool 2 to a liquid inlet 12 formed in the filter chamber 5. The mechanical filter apparatus 1 also comprises a liquid return conduit 13 for returning filtered water from a liquid outlet 14 formed in the filter chamber 5 to the swimming pool 2. In the present embodiment, an outlet of the liquid return conduit 13 is located above the level of the water W in the swimming pool 2. The liquid inlet 12 is formed in the lower closure member 10 and the liquid outlet 14 is formed in the upper closure member 9. In the present embodiment, there is an up flow of water W through the filter chamber 5 during filtration, as illustrated in FIG. 8. The unfiltered water W is introduced through the liquid inlet 12 at the bottom of the filter chamber 5; and the filtered water W exits through the liquid outlet 14 at the top of the filter chamber 5. The filter chamber 5 is sealed and the operating pressure is greater than atmospheric pressure when the pump 3 supplies unfiltered water W to the filter chamber 5.

The mechanical filter apparatus 1 also comprises a drain conduit 16 for draining water from the filter chamber 5. The drain conduit 16 may, for example, be connected to waste or to a sump for collecting waste water. In the present embodiment, the drain conduit 16 is connected to the liquid supply conduit 11 such that the filter chamber 5 is drained through the liquid inlet 12. In alternative embodiments, a separate drain outlet may be provided, for example at the bottom of the filter chamber 5. A drain valve 18 is provided for selectively opening and closing the drain conduit 16. The drain valve 18 could be manually operated, for example by operating a control lever. In the present embodiment, the drain valve 18 is actuated by a drain valve actuator 19, for example a first electromechanical actuator, such as a solenoid. A lower mesh 20 and an upper mesh 21 are provided to retain the filter elements 7 in the filter chamber 5.

The mechanical filter apparatus 1 comprises means for introducing air into the filter chamber 5 to perform backwashing. The air introduction means (denoted generally by the reference numeral 22) comprises an air supply conduit 23. The configuration of the air introducing means 22 in the present embodiment differs from that of the previous embodiment. In particular, the air supply conduit 23 is fluidly connected to the liquid return conduit 13. As described herein, the air supply conduit 23 is configured to enable air to be drawn into the filter chamber 5 through the air inlets 25 by the reduced pressure in the filter chamber 5 caused by the water W draining from the filter chamber 5. The air supply conduit 23 has an air intake 27 which is in fluid communication with the liquid return conduit 13. During backwashing of the mechanical filter apparatus 1 the air supply conduit 23 draws air through the liquid return conduit 13 which is open to atmosphere. The advantage of this arrangement is that the possibility of a leak occurring through the air supply conduit 23 is reduced since any liquid pumped through the air supply conduit 23 would be returned to the swimming pool 2 through the liquid return conduit 13. The air inlet 25 is formed in a sidewall of the filter chamber 5. The vertical offset between the air inlet 25 and the drain conduit 16 establishes a pressure differential which enables air to be drawn into the filter chamber 5 during backwashing. Thus, the air inlet 25 is disposed on the sidewall at a height above the height of the bottom of the drain conduit 16. By establishing a pressure differential, air is introduced into the filter chamber 5 when the drain valve 18 is open to perform backwashing. The height of the air inlet 25 may be adjusted to alter this pressure differential, thereby controlling the rate at which air is introduced into the filter chamber 5 during backwashing. In a variant, the air inlet 25 may comprise an adjustable height outlet nozzle. The outlet nozzle may comprise a telescopic conduit; or may be rotatable about a horizontal axis to adjust the height of the air inlet 25. By adjusting the height of the outlet nozzle, the pressure differential may be altered to controllably adjust the rate at which air is drawn into the filter chamber.

In the present embodiment, the control valve for the air supply conduit 23 may be omitted. Rather, the air supply conduit 23 may be connected directly to the liquid return conduit 13. Although a portion of the water W may pass through the air supply conduit 23, this has little or no effect on filtration since the water W is circulated through the filter chamber 5 multiple times (performing multi-pass filtration). A control valve (not shown) or a flow restrictor may optionally be disposed in the air supply conduit 23. The control valve may be configured to allow air to pass through the air supply conduit 23 during backwashing; and to prevent water exiting the filtering chamber 5 through the air supply conduit 23 during filtration. The control valve may be in the form of a one-way (check) valve. The control valve may, for example, comprise a spring-biased closure member or a closure flap (not shown) configured to open to allow air to be drawn into the air supply conduit 23 and to close to prevent water W exiting through the air supply conduit 23. Alternatively, the control valve may comprise a needle valve for controlling the air intake. The control valve may, for example, comprise a ball for locating in a valve seat to seal the air supply conduit 23. In an alternative embodiment, the control valve may be replaced with a valve member which may be selectively opened and closed. In alternative embodiments, the control valve may comprise an electromechanical actuator, such as a solenoid, for opening and closing the air supply conduit 23. In a modified arrangement, a three-way valve (not shown) may be provided selectively to connect either the filter chamber 5 or the air supply conduit 23 to the liquid return conduit 13. This implementation of a three-way valve may be used in one or more of the embodiments described herein.

As outlined above, a plurality of filter elements 7 are disposed in the filter chamber 5. When the water W is introduced into the filter chamber 5, the filter elements 7 form a filter pack 29. In the present embodiment, the filter elements 7 have substantially neutral buoyancy and, due to the upwards flow of the water W through the filter chamber 5, the filter pack 29 forms at the top of the filter chamber 5, as illustrated in FIG. 8. The filter elements 7 disposed in the filter chamber 5 may have a neutral buoyancy or a positive buoyancy in water. The flow of water W through the filter chamber 5 compacts the filter elements 7 together at the top of the filter chamber 5 and forms the filter pack 29; the movement of the filter elements 7 within the filter pack 29 is restricted. The resulting filter pack 29 is substantially static and is suitable for performing mechanical filtration of the water W.

The mechanical filter apparatus 1 comprises flow control means for controlling the supply of unfiltered water W from the swimming pool 2 to the filter chamber 5; and the return of filtered water W from the filter chamber 5 to the swimming pool 2. The flow control means comprises a liquid supply valve 38 and a liquid return valve 39. The liquid supply valve 38 is operative to open and close the liquid supply conduit 11 to control the supply of unfiltered water W to the filter chamber 5. The liquid supply valve 38 is a one-way (check) valve adapted to allow liquid to be introduced into the filter chamber 5. The liquid return valve 39 is a one-way (check) valve adapted to allow liquid to be introduced into the filter chamber 5. The liquid supply valve 38 and the liquid return valve 39 can both be closed at least substantially to seal the filter chamber 5. In a modified arrangement, the liquid supply valve 38 and/or the liquid return valve 39 comprise an electromechanical actuator.

As shown schematically in FIG. 8, the mechanical filter apparatus 1 comprises an electronic control unit (ECU) 42 for controlling operation of the pump 3 and the drain valve 18. The ECU 42 comprises a processor 43 and a memory 44. The operation of the ECU 42 is substantially unchanged from the previous embodiment. As the water W is drained from the filter chamber 5, the water in the liquid return conduit 13 is initially drawn back into the filter chamber 5 through the air supply conduit 23 and then drained through the drain conduit 16. Once the water has drained from the liquid return conduit 13, air is drawn through the liquid return conduit 13 and introduced into the filter chamber 5 through the air supply conduit 23. The introduction of air into the filter chamber 5 agitates the filter elements 7 and performs cleaning. The backwashing of the filter elements 7 is substantially the same as the previous embodiment.

The air supply conduit 23 is illustrated in FIG. 8 as being external to the filter chamber 5. In a modified arrangement, the air supply conduit 23 may extend vertically within the filter chamber 5. The air supply conduit 23 could, for example, be mounted to the upper closure member 9. The internal positioning of the air supply conduit 23 could be applied to the other embodiments described herein. The air supply conduit 23 may form said one or more air inlet 25, for example at an open end thereof. The air supply conduit 23 may be movably mounted such that the vertical position of the one or more air inlets 25 may be adjusted within the filter chamber 5. By changing the vertical height of the one or more air inlets 25, the pressure differential between the drain outlet and the air inlet 25 can be adjusted, thereby changing the rate at which air is introduced into the filter chamber 5 during backwashing. Adjustable fixing means could be provided on the upper closure member 9 for adjustably fixing the vertical position of the air supply conduit 23.

Figure 9:
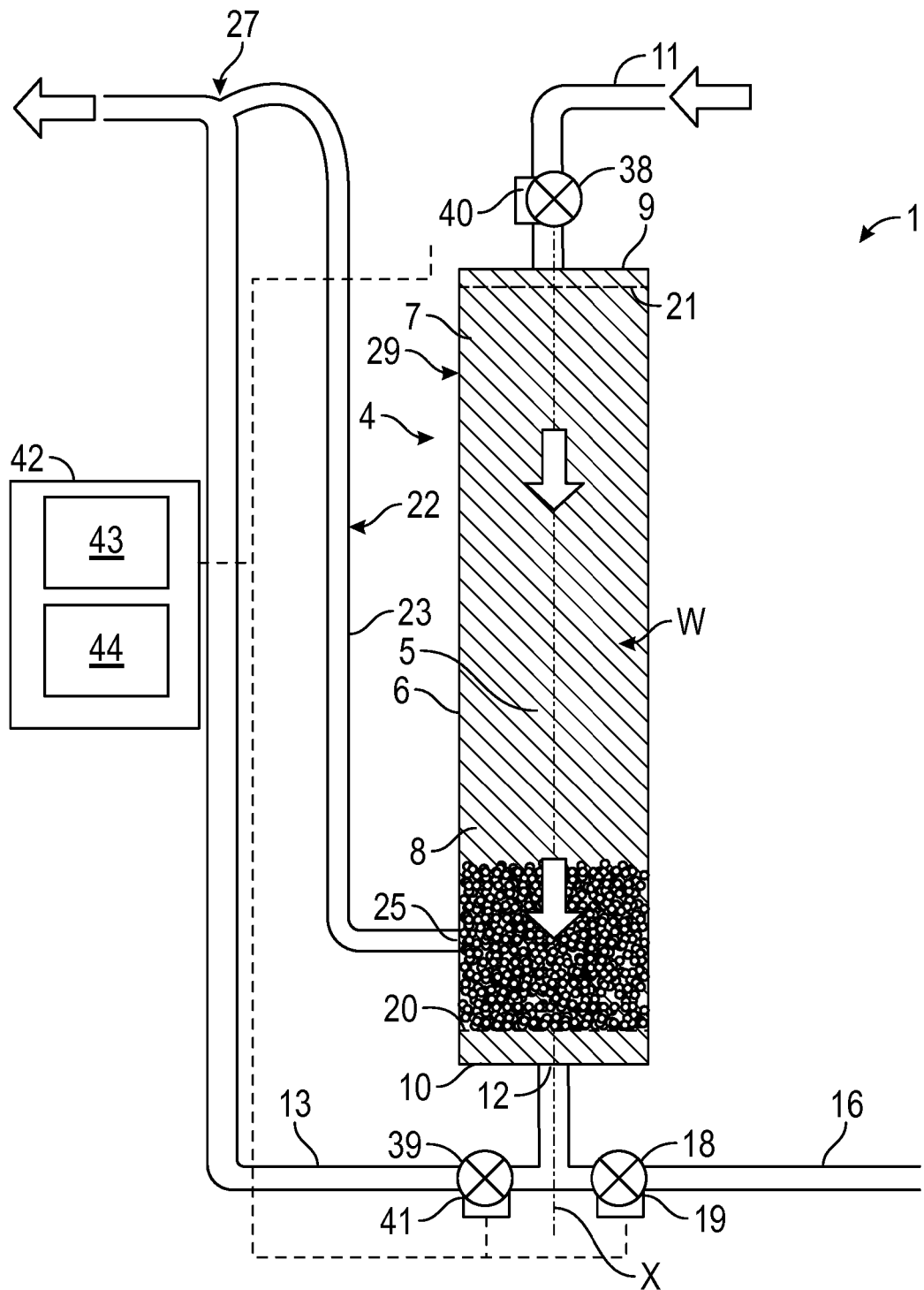
FIG. 9 is a schematic representation of a mechanical filter apparatus according to a further aspect of the present invention.

A further embodiment of the mechanical filter apparatus 1 in accordance with an aspect of the present invention is shown in FIG. 9. The mechanical filter apparatus 1 is a modified version of the embodiment described herein with reference to FIGS. 7 and 8. Like reference numerals are used for like components. The mechanical filter apparatus 1 according to the present embodiment may be incorporated into the filter system S shown in FIG. 7, for example.

As described herein, there is a down flow of water W through the filter chamber 5 during filtration, as illustrated in FIG. 9. The unfiltered water W is introduced through a liquid inlet 12 at the top of the filter chamber 5; and the filtered water W exits through a liquid outlet 14 at the bottom of the filter chamber 5. A plurality of filter elements 7 are disposed in the filter chamber 5 and collectively form a mechanical filter. The filter elements 7 have an open-cell structure. By way of example, the mechanical filter apparatus 1 may comprise filter elements 7 of the type described herein with reference to FIGS. 4, 5, 6A and 6B.

The mechanical filter apparatus 1 comprises a liquid supply conduit 11 for supplying unfiltered water from the swimming pool 2 to the liquid inlet 12 formed in the filter chamber 5. The mechanical filter apparatus 1 also comprises a liquid return conduit 13 for returning filtered water from the liquid outlet 14 formed in the filter chamber 5 to the swimming pool 2. The liquid inlet 12 is formed in the upper closure member 9 and the liquid outlet 14 is formed in the lower closure member 10. During filtration, there is a down flow of water W through the filter chamber 5, as illustrated in FIG. 9. The unfiltered water W is introduced through the liquid inlet 12 at the top of the filter chamber 5; and the filtered water W exits through the liquid outlet 14 at the bottom of the filter chamber 5. The filter chamber 5 is sealed and the operating pressure is greater than atmospheric pressure when the pump 3 supplies unfiltered water W to the filter chamber 5.

The mechanical filter apparatus 1 comprises means for introducing air into the filter chamber 5 to perform backwashing. The air introduction means (denoted generally by the reference numeral 22) comprises an air supply conduit 23. The configuration of the air introducing means 22 is unchanged from the previous embodiment. The air supply conduit 23 has an air intake 27 which is fluidly connected to the liquid return conduit 13. During backwashing of the mechanical filter apparatus 1 the air supply conduit 23 draws air through the liquid return conduit 13 which has an outlet disposed above the level of the water in the swimming pool 2 and is, therefore, open to atmosphere. The air inlet 25 is formed in a sidewall of the filter chamber 5. The air inlet 25 is disposed on the sidewall at a height above the height of drain conduit 16 in order to establish a pressure differential. By establishing a pressure differential, air is introduced into the filter chamber 5 when the drain valve 18 is open to perform backwashing.

Figure 10:
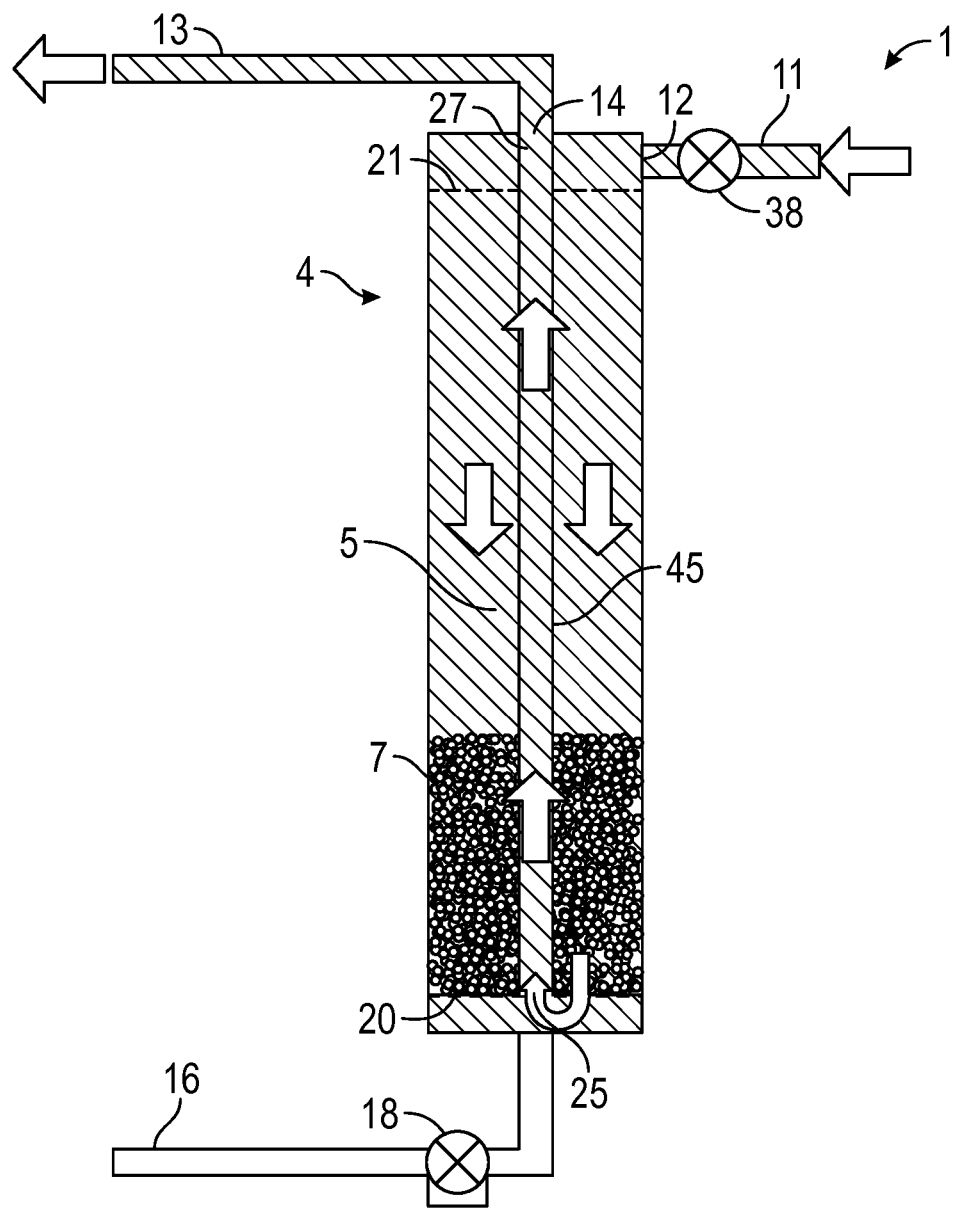
FIG. 10 is a schematic representation of the mechanical filter apparatus in accordance with a further embodiment of the present invention operating in a filtration mode.
Figure 11:
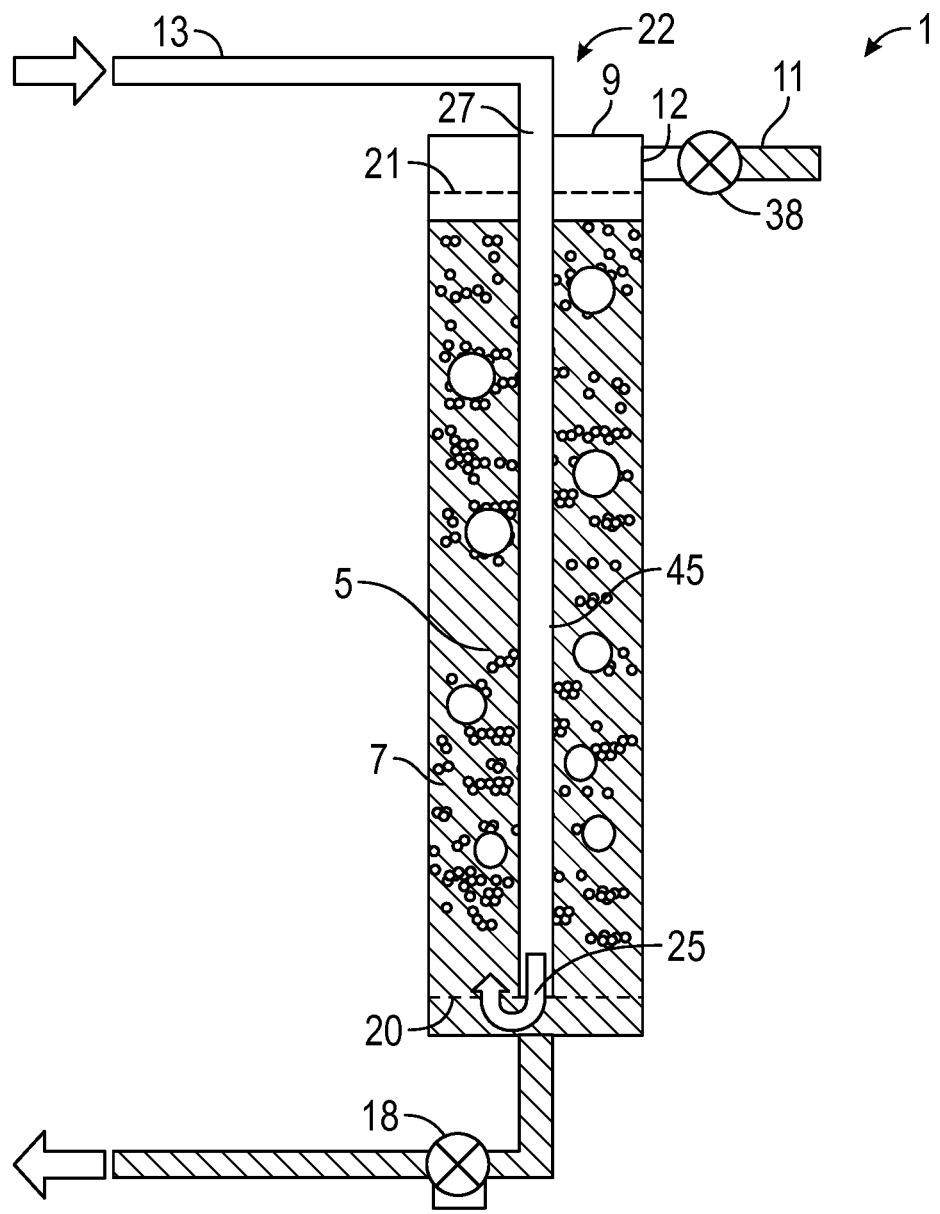
FIG. 11 is a schematic representation of the mechanical filter apparatus shown in FIG. 10 operating in a backwashing mode.

A further embodiment of the mechanical filter apparatus 1 in accordance with an aspect of the present invention is shown in FIGS. 10 and 11. The mechanical filter apparatus 1 is a modified version of the embodiment described herein with reference to FIGS. 7 and 8. Like reference numerals are used for like components. The mechanical filter apparatus 1 according to the present embodiment may be incorporated into the filter system S shown in FIG. 7, for example.

The mechanical filter apparatus 1 comprises a liquid supply conduit 11 for supplying unfiltered water from a swimming pool 2 to a liquid inlet 12. Flow control means is provided for controlling the supply of liquid to the filter chamber 5. The flow control means comprises a liquid supply valve 38 in the present embodiment. An electromechanical actuator may be provided for controlling operation of the liquid supply valve 38. A liquid return conduit 13 is provided for returning filtered water from a liquid outlet 14 to the swimming pool 2. The filter water W is returned to the swimming pool 2 through a liquid return conduit 13 having an outlet disposed above the level of the water in the swimming pool 2. A drain valve 18 is provided for controlling drainage of the filter chamber 5 through a drain conduit 16. An electromechanical actuator may be provided for controllably opening and closing the drain valve 18. As illustrated in FIG. 10, a liquid inlet 12 is disposed at the top of the filter chamber 5 for introducing water from the swimming pool 2. In the illustrated arrangement, the liquid inlet 12 is provided in a side wall of the filter chamber 5, but could be provided in the upper closure member 9. The liquid supply valve 38 and/or the drain valve 18 may be controlled by an ECU (not shown) to provide automated operation of the mechanical filter apparatus 1. Alternatively, the liquid supply valve 38 and/or the drain valve 18 may be manually operated.

In the present embodiment, the flow of water W follows a serpentine path through the filter chamber 5 during filtration. The unfiltered water W enters the filter chamber 5 through the liquid inlet 12 and travels downwardly through the filter chamber 5. The flow direction of the water W in the filter chamber 5 is reversed at or proximal to the bottom of the filter chamber 5 and the water W then flows upwardly through an internal conduit 45 disposed in the filter chamber 5. The internal conduit 45 performs the dual function of operating as an air inlet conduit during backwashing (corresponding to the air supply conduit 23 of the other embodiments described herein); and a liquid outlet conduit during filtration (corresponding to a section of the liquid return conduit 13). The internal conduit 45 in the present embodiment extends substantially vertically downwardly from a liquid outlet 14 disposed at the top of the filter chamber 5. The internal conduit 45 is disposed centrally in the filter chamber 5 coincident with a longitudinal axis X-X of the filter chamber 5. A plurality of filter elements 7 are disposed in the filter chamber 5 and collectively form a mechanical filter in an annular region of the filter chamber 5 around the internal conduit 45. The filter elements 7 have an open-cell structure. By way of example, the mechanical filter apparatus 1 may comprise filter elements 7 of the type described herein with reference to FIGS. 4, 5, 6A and 6B. The filter chamber 5 is sealed and the operating pressure is greater than atmospheric pressure when the pump 3 supplies unfiltered water W to the filter chamber 5. The vertical position of the air inlets 25 may be adjusted to alter the pressure differential between the drainage outlet and the air intake. For example, the vertical position of the internal conduit 45 may be adjustable.

In the present embodiment, the means for introducing air into the filter chamber 5 (denoted generally by the reference numeral 22) comprises the internal conduit 45. As shown in FIG. 11, the internal conduit 45 has an air intake 27 which is connected to the liquid return conduit 13 at the top of the filter chamber 5; and an air inlet 25 disposed at the bottom of the filter chamber 5. A guard or mesh is provided over the air inlet 25 to prevent the filter elements 7 escaping through the internal conduit 45. In the present embodiment, the internal conduit 45 extends downwardly through the lower mesh 20. During backwashing of the mechanical filter apparatus 1 the internal conduit 45 draws air through the liquid return conduit 13 which has an outlet above the level of the water in the swimming pool 2 and is, therefore, open to atmosphere. In this arrangement, the liquid return valve provided in the liquid return conduit 13 is optional. In a modified arrangement, a separate air inlet may be provided in the liquid return conduit 13. An air supply valve (not shown), for example comprising a one-way (check) valve, may be provided for controlling the supply of air during backwashing. If the outlet from the liquid return conduit 13 is disposed below the level of the water in the swimming pool 2, it will be understood that a separate air inlet should be provided, for example at the top of the internal conduit 45 or in the liquid return conduit 13.

In alternative embodiments of the present invention, the tubular member 8 may taper inwardly towards its base, for example to form an inverted truncated cone or pyramid. This arrangement would provide additional space for the filter elements 7 to move within the filter chamber 5 when air is initially introduced into the filter chamber 5 to break up the filter pack 29, It is believed that this may increase the movement of the filter elements 7 and promote cleaning during backwashing. At least in certain embodiments the tubular member 8 may comprise a substantially continuous taper along said longitudinal axis X-X (i.e. free from step changes in its cross-section).

A further embodiment of the mechanical filter apparatus 1 will now be described with reference to FIGS. 16 and 17. Like reference numerals are used for like components in the description of this arrangement.

Figure 16:
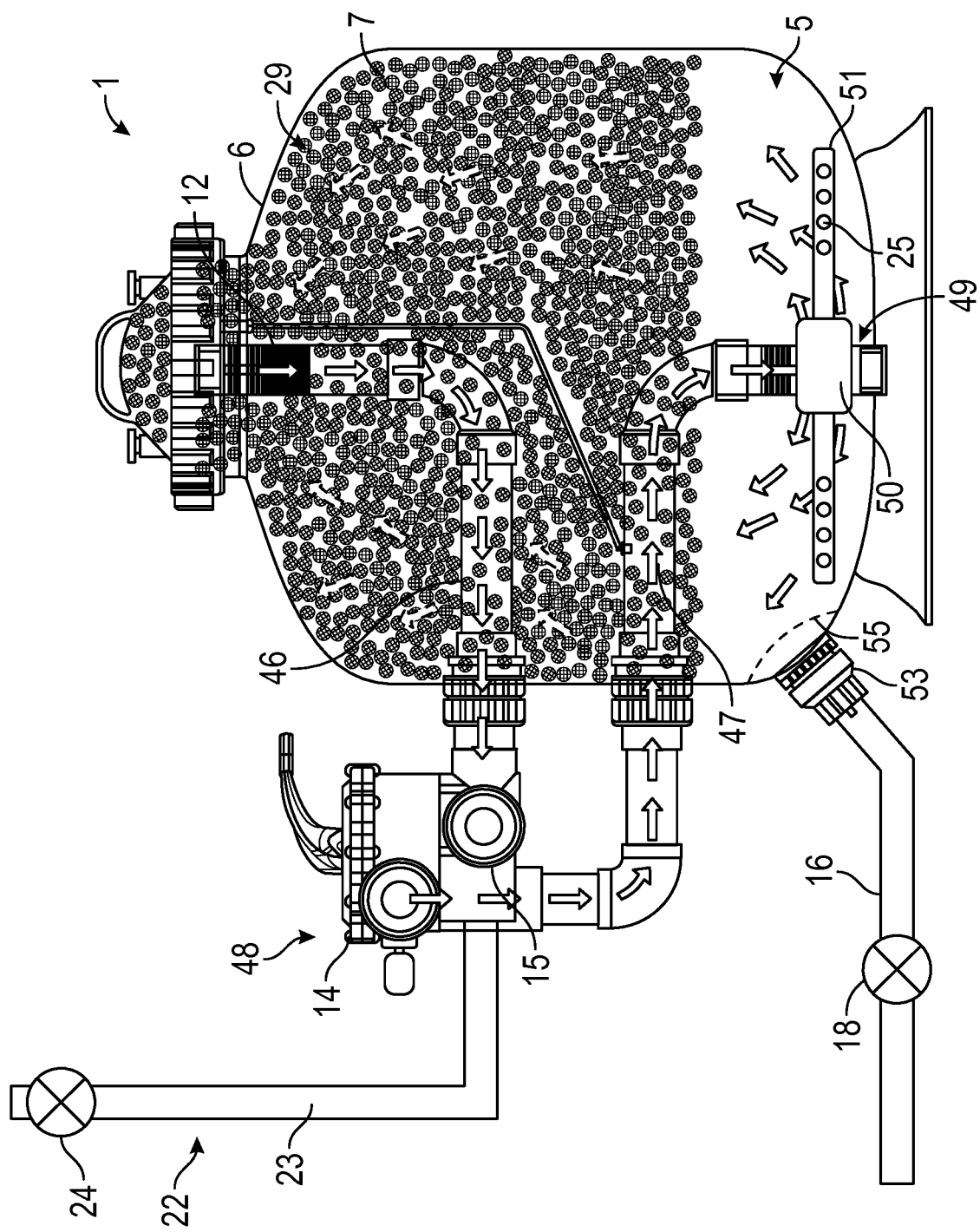
FIG. 16 shows a schematic representation of a swimming pool filter apparatus in accordance with a further embodiment of the present invention.

As shown in FIG. 16, the mechanical filter apparatus 1 comprises a filter housing 6, a first conduit 46, a second conduit 47 and a control valve 48. The filter housing 6 defines a filter chamber 5 containing a plurality of said mechanical filter elements 7 which form the static filter pack 29. In the present embodiment, the filter chamber 5 is at least substantially sealed. The mechanical filter apparatus 1 is configured such that unfiltered water from the swimming pool 2 is pumped into the filter chamber 5 through the second conduit 47 and exits through the first conduit 46. The general upwards flow of water through the filter chamber 5 is illustrated in FIG. 16 by a series of arrows. The mechanical filter elements 7 in the present embodiment have substantially neutral buoyancy or positive buoyancy in water.

As described herein, the mechanical filter apparatus 1 can comprise agitating means for agitating the mechanical filter elements 7. The mechanical filter apparatus 1 according to the present embodiment comprises means for introducing air into the filter chamber 5 to break up or disrupt the mechanical filter elements 7 forming the static filter pack 29. The air introduction means (denoted generally by the reference numeral 22) comprises an air supply conduit 23, a supply manifold 49 and a one-way valve 24. The air supply conduit 23 has an intake through which air can be drawn into the filter chamber 5. The one-way valve 40 is disposed in the air supply conduit 23 proximal to the inlet. The supply manifold 49 comprises a central chamber 50 and a plurality of distribution conduits 51. The central chamber 50 is in fluid communication with the air supply conduit 23 via the second conduit 47. The distribution conduits 51 extend radially outwardly from the central chamber 50 and are disposed at, or proximal to the base of the filter chamber 5. The distribution conduits 51 each have a plurality of air inlet apertures 25 for introducing air into the filter chamber 5. The air supply conduit 23 in the present embodiment is connected to the second conduit 47 via the control valve 48. The one-way valve 40 is configured to allow air to enter the air supply conduit 23 and to prevent water exiting through the air supply conduit 23. The one-way valve 24 may, for example, comprise a spring-biased closure member. In an alternative embodiment, the one-way valve 24 may be replaced with a two-way valve which may be selectively opened and closed.

The control valve 48 is configured such that, during filtration, the first conduit 46 is connected to a return conduit 13; and the second conduit 47 is connected to a supply conduit 11. The second conduit 47 is operative to supply unfiltered water from the swimming pool 2; and the first conduit 46 returns filtered water to the swimming pool 2. Furthermore, the control valve 48 is configured such that, during backwashing, the first conduit 46 is closed; and the second conduit 47 is connected to the air supply conduit 23. The housing 6 comprises a drainage port 53 disposed at the base of the filter chamber 5. In the present embodiment, the drainage port 53 is connected to the waste drain conduit 16 and is opened during backwashing. The control valve 48 may be configured to control the opening and closing of the drainage port 53. However, in the present embodiment, a separate drainage valve 18 is provided for opening and closing the drainage port 53. The drainage valve 4 is operated manually in the present embodiment. In alternate embodiments, the drainage valve 18 could comprise an actuator, such as a solenoid, to provide automated or partially-automated backwashing. A mesh 55 is provided over the drainage port 53 to prevent the mechanical filter elements 7 entering the waste drain conduit 16 when the drainage valve 18 is open. The mesh 55 may be configured to control the flow of water from the filter chamber 5 during backwashing, for example in dependence on the size and/or number of holes in the mesh 55.

As shown in FIG. 16, when the mechanical filter apparatus 1 is performing filtration, the water is pumped from the swimming pool 2 by the pump 5 into the filter housing 6. The pumped water is introduced into the filter chamber 5 through the second conduit 47. The unfiltered water enters the filter housing 6 through the distribution conduits 51 of the supply manifold 49. The water flows upwardly through the filter chamber 5 and exits through the first conduit 46. It will be understood that an up-flow of water is established through the filter chamber 5 during filtration. The upwards movement of the water displaces the mechanical filter elements 7 upwardly such that the static filter pack 29 is formed at the top of the filter chamber 5.

Figure 17:
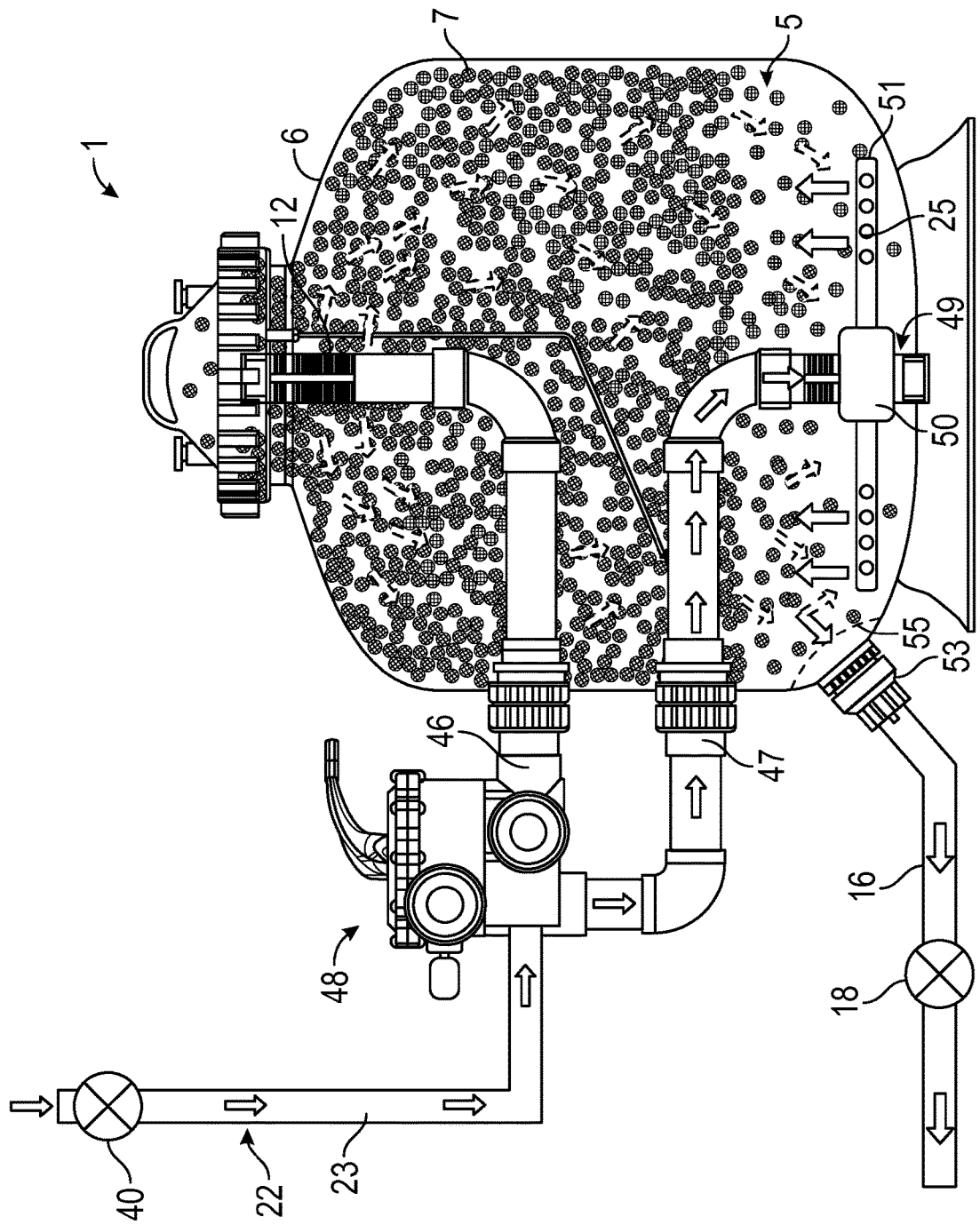
FIG. 17 shows a schematic representation of the swimming pool filter shown in FIG. 16 during a backwashing operation.

As shown in FIG. 17, when the mechanical filter apparatus 1 is performing backwashing, the pump 5 is stopped to inhibit the supply of water from the swimming pool 2 to the filter housing 6.

The control valve 48 is operated to close the first conduit 46 and to connect the second conduit 47 to the air supply conduit 23. The drainage valve 18 is then opened to allow the water in the filter housing 6 to flow through the drainage port 53 into the waste drain conduit 16. Since the filter housing 6 is sealed, the flow of water out of the filter chamber 5 reduces the pressure within the filter housing 6 causing the one-way valve 24 to open allowing air to be drawn into the air supply conduit 23. By draining water from the sealed filter chamber 5, the operating pressure drops below atmospheric pressure, thereby drawing air into the filter chamber 5 through the air supply conduit 23. The air enters the central chamber 50 and is drawn through into the distribution conduits 51. The air is then introduced into the filter chamber 5 through the air inlet apertures 25 formed in the distribution conduits 51. The resulting air bubbles travel upwardly through the water in the filter chamber 5 and disrupt the suspended mechanical filter elements 7. The mechanical filter elements 7 are agitated by the air bubbles and the static filter pack 29 is broken up. It will be appreciated that the water in the filter chamber 5 continues to drain through the drainage port 53, such that the level of the water continues to drop causing further agitation of the mechanical filter elements 7 within the filter chamber 5. It will be understood that, by agitating the mechanical filter elements 7, material and debris filtered by the mechanical filter elements 7 is dislodged and returned to the water within the filter chamber 5. The agitation of the mechanical filter elements 7 continues until the water level in the filter chamber 5 drops below the position of the air inlet apertures 25 formed in the distribution conduit 51. The introduction of air into the filter chamber 5 continues concurrently with drainage of the water from the filter chamber 5. By draining the water through the waste drain conduit 16, the material and debris is expelled from the filter chamber 5. The mechanical filter elements 7 may thereby be cleaned ready to perform additional filtration. The pressure in the filter chamber 5 returns to atmospheric pressure and the one-way valve 24 closes.

When the filter chamber 5 is empty, the control valve 48 is operated to open the second conduit 47 and the pump 35 re-started. The control valve 48 can be operated to open the first conduit 46. The drainage valve 18 is operated to close the drainage port 53 partially or completely to re-fill the filter chamber 5 with water from the swimming pool 2. The drainage valve 18 may be closed after opening the second conduit 47 to perform additional washing of the mechanical filter elements 7 and optionally to flush the second conduit 47. In alternative arrangements, the drainage valve 18 may be closed before or concurrent with opening of the second conduit 47. The backwashing may optionally be performed more than once. For example, the filter chamber 5 may be partially or completely re-filled, the second conduit 47 closed and the drainage valve 18 re-opened. It will be understood that the drainage valve 18 may be incorporated into the control valve 48.

When backwashing is complete, the control valve 48 is operated to open the first and second conduits 46, 47. The pump 3 is re-started to pump water from the swimming pool 2 to the filter housing 6. The drainage valve 18 is operated to close the drainage port 53 and the filter chamber 5 is refilled with water from the swimming pool 2. The mechanical filter elements 7 re-form the static filter pack 29 and are operative to perform mechanical filtration of the water.

The air introduction means 22 described with reference to the present embodiment is a passive system insofar as it relies on the water draining from the filter chamber 5 to draw air through the air supply conduit 23. Alternatively, or in addition, an air pump may be provided actively to pump air through the air supply conduit 23.

The mechanical filter apparatus 1 shown in FIG. 16 can be implemented by modifying a conventional swimming pool filter apparatus, such as a sand bed filter. According to further aspects of the present invention, there is provided a conversion kit for converting an existing swimming pool filter apparatus; and a method of converting an existing swimming pool filter apparatus.

It will be appreciated that various modifications may be made to the embodiment(s) described herein without departing from the scope of the appended claims. The present invention has been described with reference to mechanically filtering the water W in one or more aquaria or swimming pool 2.

At least some of the air inlets 25 may be sized to form bubbles of air which may enter the filter cells 30 formed within the filter elements 7 to dislodge trapped material. Some of the air inlets 25 may be larger to promote agitation of the filter elements 7, for example to break up the filter pack 29. In certain embodiments, the air inlets 25 may be different sizes to promote formation of bubbles having different sizes.

It will be understood that other types of filtration, such as biological filtration, may be performed in addition to mechanical filtration. It is envisaged that any such biological filtration would be performed as a separate filtration stage, for example in a separate biological filtration chamber. However, under appropriate conditions, a biofilm may be allowed to develop on the filter elements 7. In these scenarios, the filter elements 7 may also perform biological filtration of the water at the same time as mechanical filtration. The mechanical filter apparatus 1 may be used in combination with an ultra violet (UV) filter to clarify the water W.

A throttle or restriction may be provided in the air supply conduit 23 to control the introduction of air into the filter chamber 5, for example to extend the time taken to drain the filter chamber 5 and to prolong backwashing. A control valve may be provided in the air supply conduit 23 for selectively controlling the introduction of air into the filter chamber 5. The control valve may be adjustable to control the introduction of air during backwashing. The control valve could be manually operated. Alternatively, the control valve may comprise an electromechanical actuator, such as a solenoid or a servo. In certain embodiments, the control valve may be controlled by the ECU 42.

In a variant of the embodiment described herein, the air supply conduit 23 may be arranged such that the air intake 27 is disposed at a position above the level of the water W in the filter chamber 5. The height of the air intake 27 may optionally also be positioned in dependence on the maximum operating pressure generated in the filter chamber 5 by the pump 3. In these arrangements, the check valve 24 could be omitted from the mechanical filter apparatus 1.

The mechanical filter apparatus 1 has been described with reference to filtering water from several aquaria 2. It will be understood that the mechanical filter apparatus 1 may be configured to filter the water from a single aquarium. Furthermore, at least certain embodiments of the present invention may have other applications, for example filtering the water in a swimming pool. Alternatively, or in addition, the filter apparatus may be suitable for filtering water in ponds, aqua-culture, swimming pools, swimming baths, swimming ponds, leisure pools, hot tubs, spas and leisure parks.

In the embodiment described herein, either the liquid supply conduit 11 or the liquid return conduit 13 opens into a lower portion of the filter chamber 5. The mechanical filter apparatus 1 may be modified to utilise a profile of either the liquid supply conduit 11 or the return conduit 12 as part of the air introducing means 22 to supply air into the filter chamber 5. The liquid supply valve 38 may, for example, be configured to connect the liquid supply conduit 11 to an air supply conduit 23 through which air may be drawn into filter chamber 5.

The filter chamber 5 has been described herein as being in the form of a cylinder having a uniform circular cross-section along the longitudinal axis X-X. In alternative embodiments, the filter chamber 5 may have a substantially continuously tapered profile along said longitudinal axis X-X. The sidewall 6 may taper inwardly in an upwards direction, for example to form a truncated cone or a truncated pyramid. Alternatively, the sidewall 6 may taper inwardly in a downwards direction, for example to form an inverted truncated cone or an inverted truncated pyramid.

Figure 12:
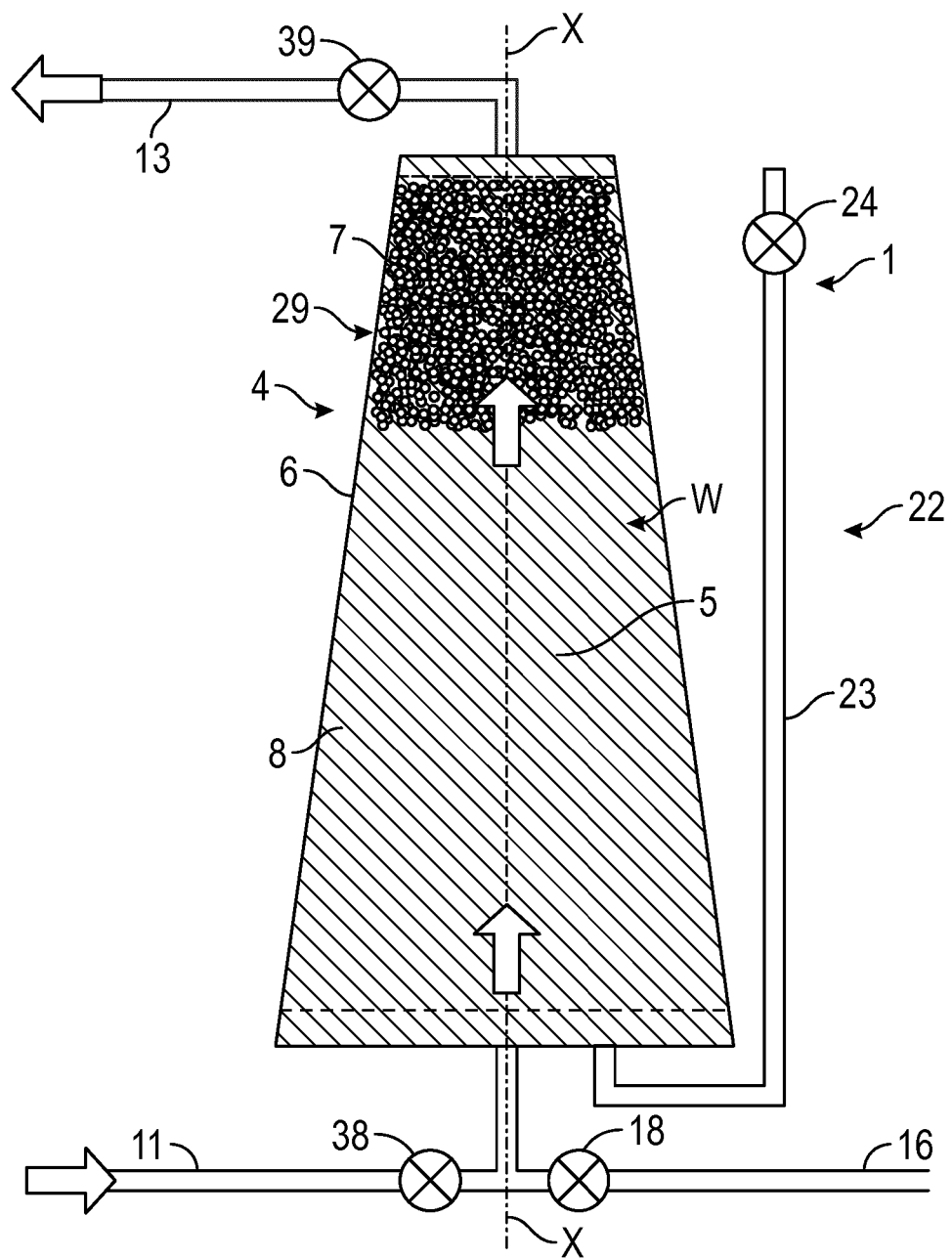
FIG. 12 is a schematic representation of a mechanical filter apparatus according to a further embodiment of the present invention.

A further embodiment of the mechanical filter apparatus 1 is shown schematically in FIG. 12. Like reference numerals are used for like components. In this arrangement, the filter chamber 5 consists of a substantially continuously tapered profile. The profile is tapered along the longitudinal axis X-X of the filter chamber 5. In the present embodiment, the sidewall 6 is tapered inwardly in an upwards direction. Thus, the filter chamber 5 has a profile which is continuously tapered inwardly along the longitudinal axis X-X from a base to a top thereof. The filter chamber 5 has a substantially circular cross-section and forms a truncated cone. A plurality of filter elements 7 are disposed in the filter chamber 5 to perform mechanical filtration of the water W. The filter elements 7 form a filter pack 29 for performing mechanical filtration.

The mechanical filter apparatus 1 comprises a liquid supply conduit 11 for supplying unfiltered water to a liquid inlet 12 formed in the filter chamber 5. The mechanical filter apparatus 1 also comprises a liquid return conduit 13 for returning filtered water W from a liquid outlet 14 formed in the filter chamber 5. The liquid inlet 12 is disposed at the bottom of the filter chamber 5 and the liquid outlet 14 is disposed at the top of the filter chamber 5. The water W flows upwardly through the filter chamber 5 from the liquid inlet 12 to the liquid outlet 14. A liquid supply valve 38 is provided to open and close the liquid supply conduit 11; and a liquid return valve 39 is provided to open and close the liquid return conduit 13. The mechanical filter apparatus 1 comprises a drain conduit 16 and a drain valve 18. In the present embodiment, the drain conduit 16 is connected to the liquid supply conduit 11.

In the present embodiment, the filter elements 7 have substantially neutral buoyancy or positive buoyancy. The up flow of water W causes the filter elements 7 to form a filter pack 29 at the top of the filter chamber 5. Air introducing means 22 is provided for introducing air into the filter chamber 5 during backwashing. The air introducing means 22 comprises an air supply conduit 23 and is configured to allow air to be drawn into the filter chamber 5 through a plurality of air inlets 25 as water W is drained from the filter chamber 5.

The operation of the mechanical filter apparatus 1 to perform filtration and backwashing is unchanged from the embodiment described above. The mechanical filter apparatus 1 is illustrated performing filtration in FIG. 12. During filtration, the tapered configuration of the filter chamber 5 helps to compact the filter elements 7 together as they are displaced upwardly by the up flow of water W through the filter chamber 5. During backwashing, the water W is drained from the filter chamber 5 and the volume available for movement of the filter elements 7 increases as the level of the water W drops. The air introducing means 22 allows air to be drawn into the filter chamber 5 by the reduced pressure in the filter chamber 5 caused by the water W draining from the filter chamber 5. The air enters the filter chamber 5 through the air inlets 25 and bubbles upwardly through the water W thereby promoting agitation of the filter elements 7. At least in certain embodiments the tapered profile of the filter chamber 5 may facilitate filtration and backwashing.

Figure 13:
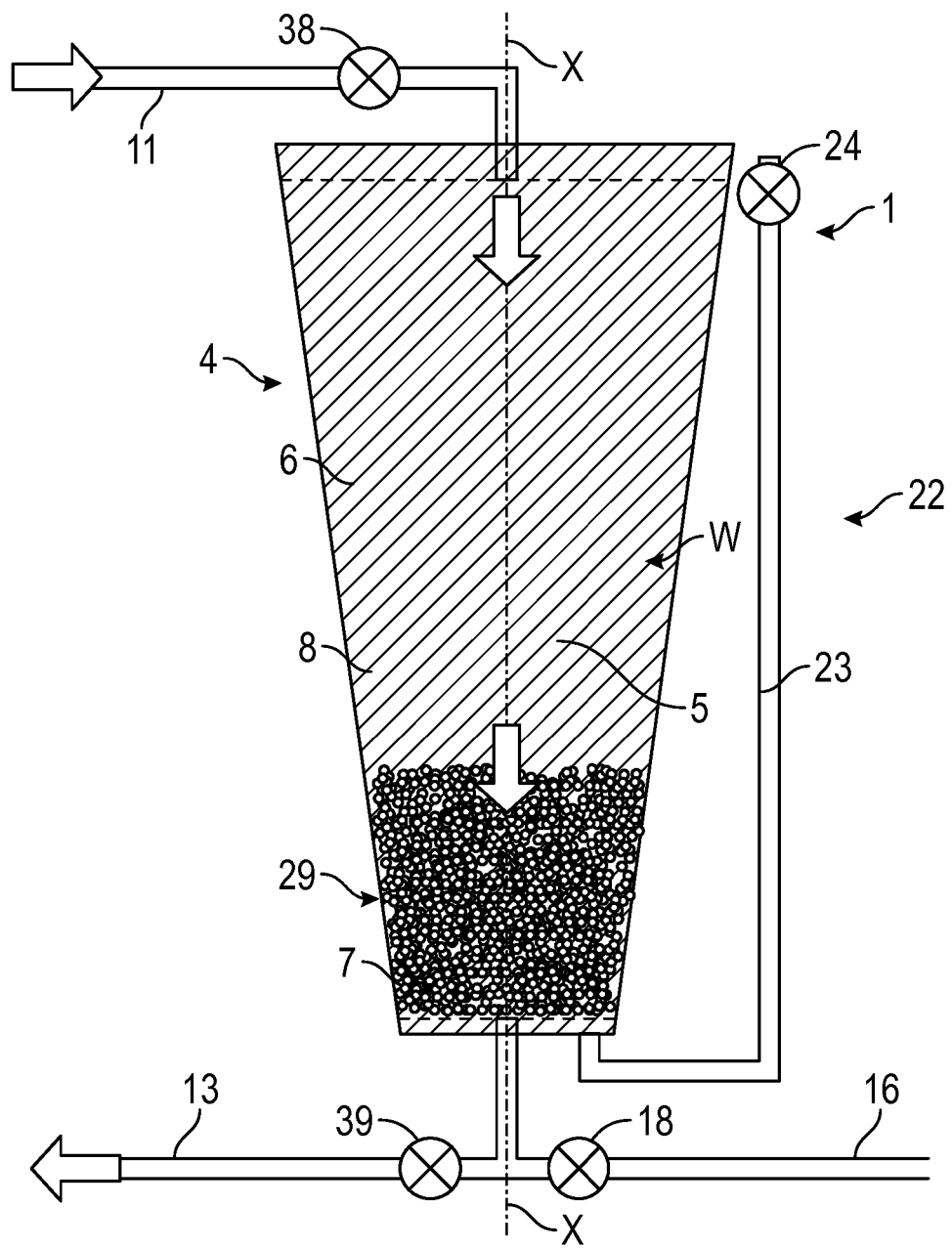
FIG. 13 is a schematic representation of a mechanical filter apparatus according to a further embodiment of the present invention.
Figure 14:
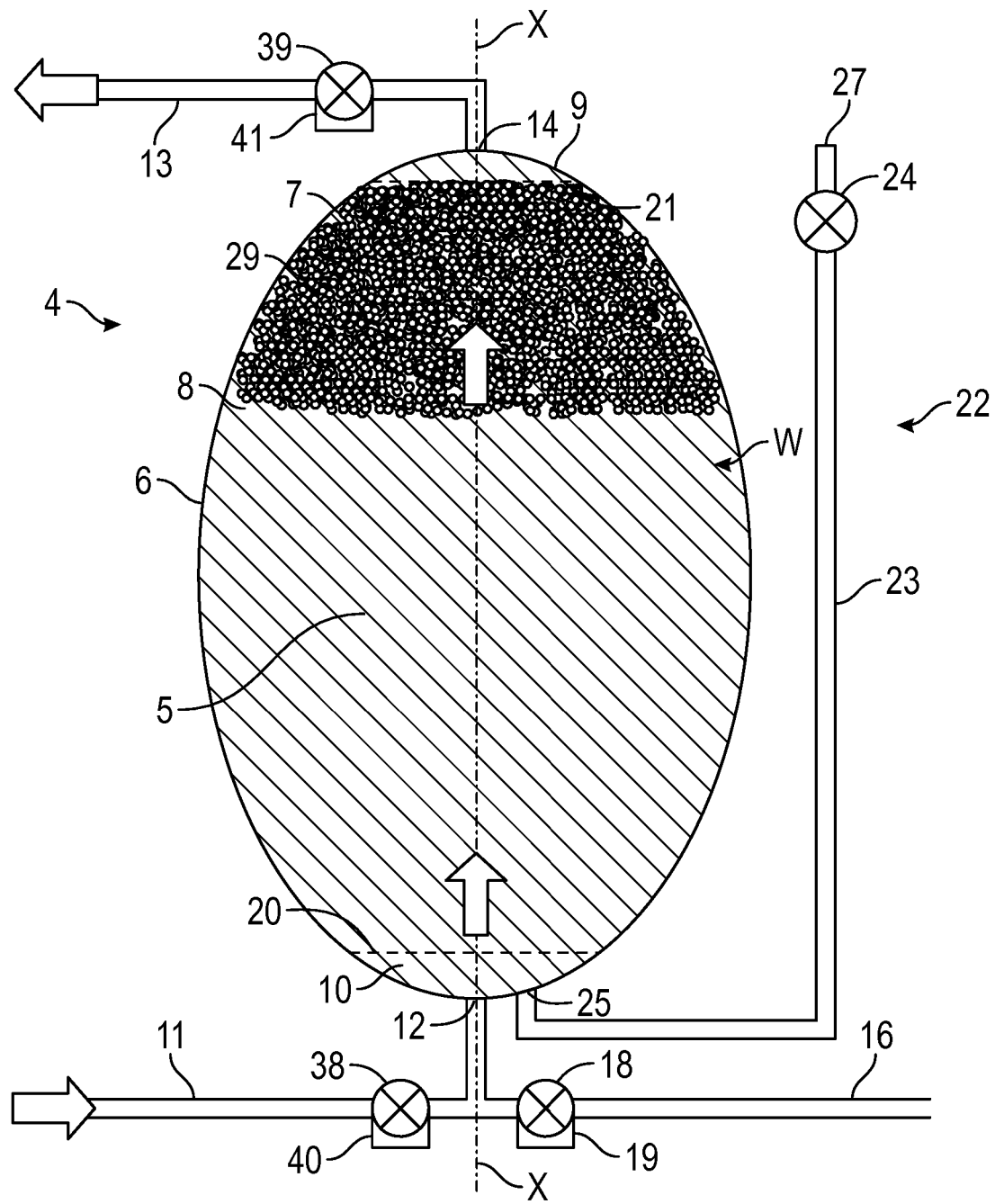
FIG. 14 is a schematic representation of a mechanical filter apparatus according to a further embodiment of the present invention.

A further embodiment of the mechanical filter apparatus 1 is shown schematically in FIG. 13. Like reference numerals are used for like components. In this arrangement, the filter chamber 5 consists of a substantially continuously tapered profile. The profile is tapered along the longitudinal axis X-X of the filter chamber 5. In the present embodiment, the sidewall 6 is tapered outwardly in an upwards direction. Thus, the filter chamber 5 has a profile which is continuously tapered outwardly along the longitudinal axis X-X from a base to a top thereof. The filter chamber 5 has a substantially circular cross-section and forms an inverted truncated cone. A plurality of filter elements 7 are disposed in the filter chamber 5 to perform mechanical filtration of the water W. The filter elements 7 form a filter pack 29 for performing mechanical filtration.

The mechanical filter apparatus 1 comprises a liquid supply conduit 11 for supplying unfiltered water to a liquid inlet 12 formed in the filter chamber 5. The mechanical filter apparatus 1 also comprises a liquid return conduit 13 for returning filtered water W from a liquid outlet 14 formed in the filter chamber 5. The liquid inlet 12 is disposed at the top of the filter chamber 5 and the liquid outlet 14 is disposed at the bottom of the filter chamber 5. The water W flows downwardly through the filter chamber 5 from the liquid inlet 12 to the liquid outlet 14. A liquid supply valve 38 is provided to open and close the liquid supply conduit 11; and a liquid return valve 39 is provided to open and close the liquid return conduit 13. The mechanical filter apparatus 1 comprises a drain conduit 16 and a drain valve 18. In the present embodiment, the drain conduit 16 is connected to the liquid return conduit 13.

In the present embodiment, the filter elements 7 have substantially neutral buoyancy or negative buoyancy. The down flow of water W causes the filter elements 7 to form a filter pack 29 at the bottom of the filter chamber 5. Air introducing means 22 is provided for introducing air into the filter chamber 5 during filtration. The air introducing means 22 comprises an air supply conduit 23 and is configured to allow air to be drawn into the filter chamber 5 through a plurality of air inlets 25 as water W is drained from the filter chamber 5.

The operation of the mechanical filter apparatus 1 to perform filtration and backwashing is unchanged from the embodiment described above. The mechanical filter apparatus 1 is illustrated performing filtration in FIG. 13. During filtration, the tapered configuration of the filter chamber 5 helps to compact the filter elements 7 together as they are displaced downwardly by the down flow of water W through the filter chamber 5. During backwashing, the water W is drained from the filter chamber 5 and the volume available for movement of the filter elements 7 increases as the level of the water W drops. The air introducing means 22 allows air to be drawn into the filter chamber 5 by the reduced pressure in the filter chamber 5 caused by the water W draining from the filter chamber 5. The air enters the filter chamber 5 through the air inlets 25 and bubbles upwardly through the water W thereby promoting agitation of the filter elements 7. At least in certain embodiments the tapered profile of the filter chamber 5 may facilitate filtration and backwashing.

A further embodiment of the mechanical filter apparatus 1 is shown schematically in FIG. 13. Like reference numerals are used for like components. In this arrangement, the filter chamber 5 comprises a convex profile along said longitudinal axis. The sidewall 6 in the present embodiment comprises or consists of a spheroid. The spheroid could be truncated, top and/or bottom, to form a part-spheroid. The filter chamber 5 has a substantially circular cross-section in a plane perpendicular to said longitudinal axis. A plurality of filter elements 7 disposed in the filter chamber 5 performs mechanical filtration of the water W. The filter elements 7 form a filter pack 29 for performing mechanical filtration.

The mechanical filter apparatus 1 comprises a liquid supply conduit 11 for supplying unfiltered water to a liquid inlet 12 formed in the filter chamber 5. The mechanical filter apparatus 1 also comprises a liquid return conduit 13 for returning filtered water W from a liquid outlet 14 formed in the filter chamber 5. The liquid inlet 12 is disposed at the bottom of the filter chamber 5 and the liquid outlet 14 is disposed at the top of the filter chamber 5. The water W flows upwardly through the filter chamber 5 from the liquid inlet 12 to the liquid outlet 14. In the present embodiment, the filter elements 7 have substantially neutral buoyancy or positive buoyancy. The up flow of water W causes the filter elements 7 to form a filter pack (not shown) at the top of the filter chamber 5. Air introducing means 22 is provided for introducing air into the filter chamber 5 during filtration. The air introducing means 22 comprises an air supply conduit 23 and is configured to allow air to be drawn into the filter chamber 5 through a plurality of air inlets 25 as water W is drained from the filter chamber 5.

The operation of the mechanical filter apparatus 1 to perform filtration and backwashing is unchanged from the embodiment described above. During filtration, the tapered configuration of the filter chamber 5 helps to compact the filter elements 7 together as they are displaced upwardly towards the top of the filter chamber 5 by the up flow of water W. During backwashing, the water W is drained from the filter chamber 5 and the volume available for movement of the filter elements 7 increases (due to the increasing cross-section of the filter chamber) as the level of the water W drops to the vertical mid-point of the filter chamber 5. Thereafter, the volume available for movement of the filter elements 7 decreases (due to the decreasing cross-section of the filter chamber) as the level of the water W drops below the vertical mid-point of the filter chamber 5. The air introducing means 22 allows air to be drawn into the filter chamber 5 by the reduced pressure in the filter chamber 5 caused by the water W draining from the filter chamber 5. The air enters the filter chamber 5 through the air inlets 25 and bubbles upwardly through the water W thereby promoting agitation of the filter elements 7. At least in certain embodiments the tapered profile of the filter chamber 5 may facilitate filtration and backwashing.

It will be appreciated that the arrangement of the filter apparatus 1 shown in FIG. 13 may be reversed such that the filter elements 7 form a filter pack at the bottom of the filter chamber 5 during filtration. As described herein, this arrangement may be implemented by reversing the arrangement of the liquid inlet 12 and the liquid outlet 14 such that a down flow of water W is established through the filter chamber 5.

Figure 15A:
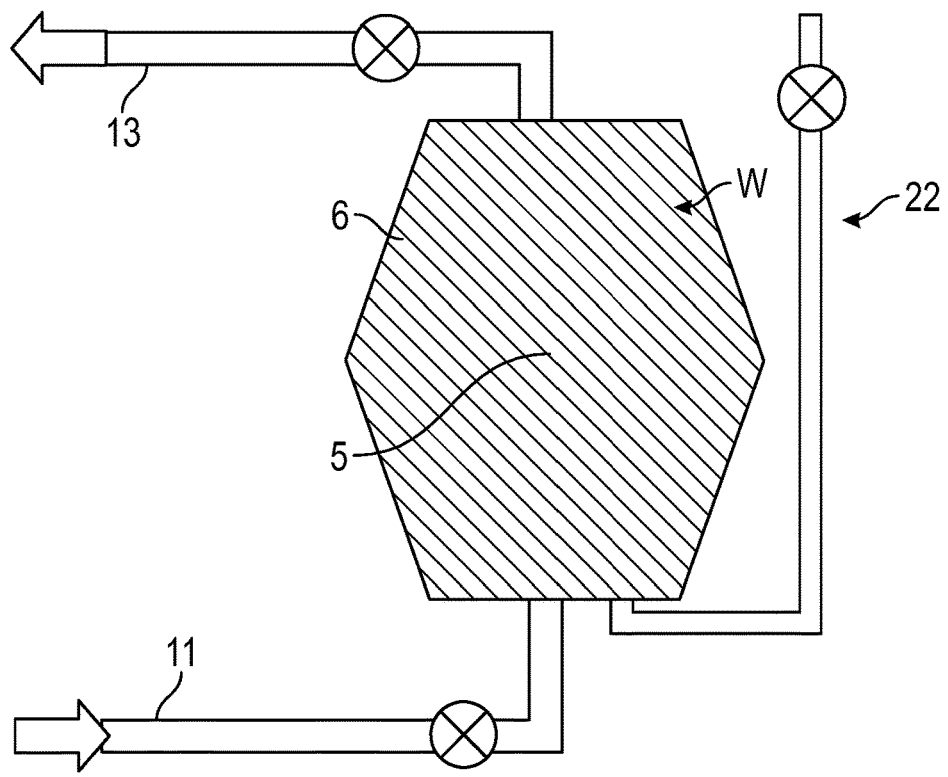
FIGS. 15A and 15B are schematic representations of mechanical filter apparatus according to further embodiment of the present invention.
Figure 15B:
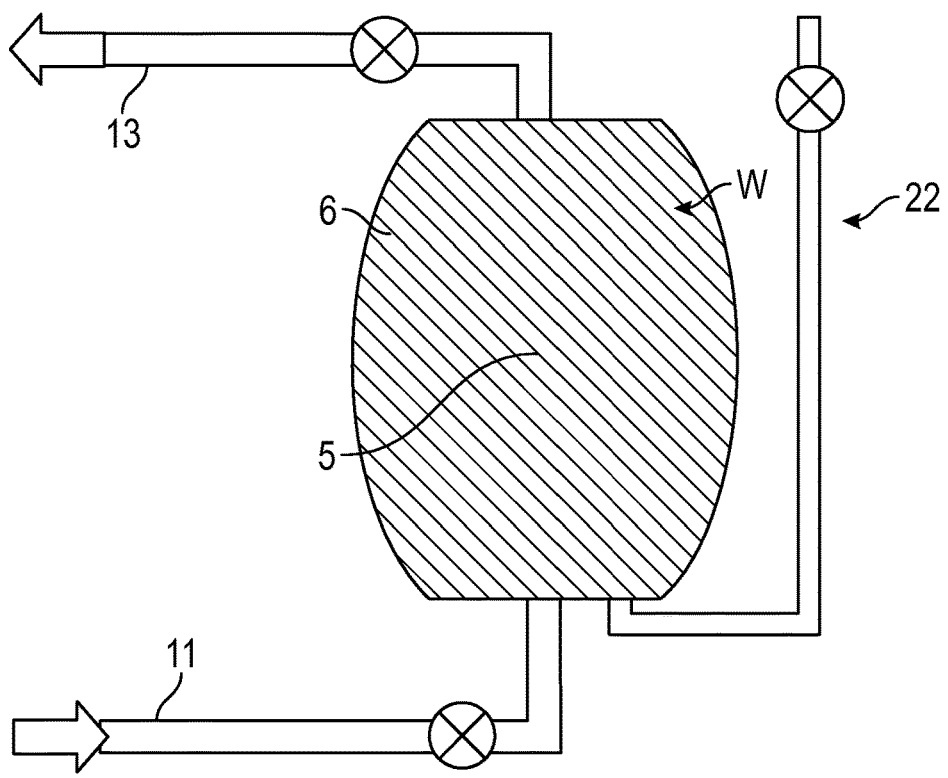

The configuration of the filter chamber 5 may be further modified from the arrangements already described herein. The filter chamber 5 could, for example, have a convex profile along said longitudinal axis defined by a sidewall 6 comprising or consisting of a double-cone, as shown in FIG. 15A. Furthermore, to form said convex profile along said longitudinal axis, the filter chamber 5 may be defined by a sidewall 6 comprising or consisting of a part-spheroid, as shown in FIG. 15B. The filter chamber 5 may be circular, polygonal or elliptical in cross-section (i.e. perpendicular to the longitudinal axis X-X).

It will be appreciated that various changes and modifications may be made to the embodiments of the mechanical filter apparatus 1 described herein without departing from the scope of the present application.

The mechanical filter apparatus 1 has been described herein with reference to an arrangement in which the drain conduit 16 has a common connection to the filter chamber 5. In particular, the drain conduit 16 is connected to either the liquid supply conduit 11 or the liquid return conduit 13, depending on which of the liquid inlet 12 and the liquid outlet 14 is disposed at the bottom of the filter chamber 5. In alternative embodiments, the drain conduit 16 can be separate from the liquid inlet 12 and the liquid outlet 14. For example, a separate drain conduit 16 may be connected to a drain outlet (not shown) formed at or proximal to the bottom of the filter chamber 5. In this arrangement, the liquid supply valve 38 may optionally remain open during backwashing. The drop in pressure in the filter chamber 5 when the drain valve 18 is opened is sufficient to draw air into the filter chamber 5 to agitate the filter elements 7. Indeed, in certain embodiments, the pump 3 may continue to operate during backwashing such that the supply of unfiltered water W to the filter chamber 5 continues. The control strategy described herein may be modified such that the liquid supply valve 38 remains open and the pump 3 continues to operate during backwashing to supply unfiltered water W to the filter chamber 5. It will be appreciated that the liquid supply valve 38 could be omitted in certain variants.

The filter chamber 5 has been described herein as having a substantially constant profile along said longitudinal axis. The configuration of the filter chamber may be modified according to modified arrangements of the present invention. By way of example, one or more baffles or restrictions may be provided in the filter chamber. It is envisaged that one or more annular member may be disposed inside the tubular member 8 forming the filter chamber 5. The one or more annular member may each comprise first and second conical surfaces arranged to form a concave restriction in the sidewall of the filter chamber.

The drain valve 18, the liquid supply valve 38 and the liquid return valve 39 are described herein as being controlled by the ECU 42. An electromechanical actuator may be provided for actuating the drain valve 18, the liquid supply valve 38 and the liquid return valve 39. The electromechanical actuator(s) may comprise a solenoid or a servo actuator. Other types of actuated valve are also contemplated. In a modified embodiment, the liquid supply valve 38 and/or the liquid return valve 39 may comprise a one-way (check) valve.

The mechanical filter apparatus 1 has been described herein as incorporating a sealed filter chamber 5 capable of supporting an operating pressure greater than atmospheric pressure. It will be understood that the mechanical filter apparatus 1 may be modified such that the operating pressure in the filter chamber 5 is less than atmospheric pressure. In particular, the mechanical filter apparatus 1 may be reconfigured such that the filter chamber 5 is on the suction side of the pump 3. For example, the pump 3 may be disposed in the liquid return conduit 13. The other connections to the filter chamber 5, including the air introducing means 22, may remain unchanged in this arrangement.

It will be understood that more than one of the filter apparatus 1 described herein may be arranged in series or in parallel to perform filtration. An array comprising a plurality of the filter apparatus 1 may be assembled depending on the volume of liquid to be filtered. In certain embodiments, the filter apparatus 1 may have a modular configuration to facilitate assembly of the array.

The invention claimed is:

1. A filter apparatus comprising:
   a filter housing comprising a tubular member having a longitudinal axis, a liquid inlet and a liquid outlet, the filter housing defining a filter chamber having a sidewall defined by the tubular member, wherein the filter chamber has a substantially constant profile or a substantially continuously tapered profile along the longitudinal axis without constrictions or narrowing sections, the filter chamber comprising a plurality of mechanical filter elements for forming a static filter pack to perform mechanical filtration of a liquid, the mechanical filter elements each having an open cell structure comprising a plurality of open cells, the plurality of open cells each having a cross-sectional area less than 3 mm$^2$;
   the filter apparatus being configured to generate a flow of the liquid through the mechanical filter elements during filtration;
   wherein the filter apparatus is configured to establish a flow rate per unit cross-sectional area of the static filter pack in the range 150 m$^3$/m$^2$/h to 550 m$^3$/m$^2$/h during filtration.

2. A filter apparatus as claimed in claim 1, wherein the filter apparatus is configured to establish a flow rate per unit cross-sectional area of the static filter pack of approximately 350 m$^3$/m$^2$/h.

3. An aquatic system comprising one or more container for containing a predetermined volume of liquid and a filter apparatus as claimed in claim 1, wherein the filter apparatus is configured to filter the liquid in the one or more container.

4. An aquatic system as claimed in claim 3, wherein the filter chamber of the filter apparatus is adapted such that the filter chamber has a volume which is substantially equal to the predetermined volume of liquid in said one or more container divided by a predefined numerical value n which is in the range 30 to 70 inclusive.

5. A filter apparatus as claimed in claim 1 comprising an electronic control unit (ECU) for controlling a drain valve actuator and/or an inlet valve actuator and/or an outlet valve actuator and/or a check valve actuator to perform filtration or backwashing.

6. A filter apparatus as claimed in claim 5, wherein the ECU is configured to control a frequency with which backwashing is performed such that between 10% and 20% of the liquid being filtered is replaced on a weekly basis.

7. A filter apparatus as claimed in claim 1, wherein the filter apparatus comprises an air supply conduit having at least one air inlet for introducing air into the filter chamber to agitate the filter elements, the filter chamber being substantially sealed such that the air introducing means draws air into the filter chamber as liquid is drained from said filter chamber.

8. A filter apparatus as claimed in claim 7, wherein the air supply conduit is configured to draw air through a liquid return conduit connected to the liquid outlet.

9. A filter apparatus as claimed in claim 8, wherein the air supply conduit is connected to the liquid return conduit downstream of a liquid return valve for controlling the return of filtered liquid from the filter chamber.

10. A method of filtering a liquid in a filter chamber defined by a filter housing, the filter housing comprises a tubular member having a longitudinal axis, a liquid inlet and a liquid outlet, wherein the tubular member defines a sidewall of the filter chamber, the filter chamber having a substantially constant profile or a substantially continuously tapered profile along the longitudinal axis without constrictions or narrowing sections, the method comprising:
    establishing a flow of liquid through a static filter pack in the filter chamber, wherein the static filter pack is formed of a plurality of filter elements, the filter elements each having an open cell structure comprising a plurality of open cells, the plurality of open cells each having a cross-sectional area less than 3 mm$^2$;
    wherein a flow rate per unit cross-sectional area of the static filter pack is in the range 150 m$^3$/m$^2$/h to 550 m$^3$/m$^2$/h.

11. A method as claimed in claim 10, wherein the plurality of filter elements are contained in a filter chamber, the method comprising introducing air into the filter chamber through one or more air inlets to agitate the filter elements.

12. A method as claimed in claim 11, further comprising allowing air to be drawn into the filter chamber as liquid is drained from the filter chamber.

13. A method as claimed in claim 12, wherein the air is drawn into the filter chamber through an air supply conduit connected to a liquid return conduit connected to the filter chamber.

* * * * *